US012425846B2

(12) United States Patent
Balasubramanian et al.

(10) Patent No.: US 12,425,846 B2
(45) Date of Patent: Sep. 23, 2025

(54) SECURE SIDELINK COMMUNICATION

(71) Applicant: QUALCOMM Incorporated, San Diego, CA (US)

(72) Inventors: Anantharaman Balasubramanian, San Diego, CA (US); Hong Cheng, Basking Ridge, NJ (US); Junyi Li, Fairless Hills, PA (US); Shuanshuan Wu, San Diego, CA (US); Kapil Gulati, Belle Mead, NJ (US)

(73) Assignee: Qualcomm Incorporated, San Diego, CA (US)

( * ) Notice: Subject to any disclaimer, the term of this patent is extended or adjusted under 35 U.S.C. 154(b) by 660 days.

(21) Appl. No.: 17/452,974

(22) Filed: Oct. 29, 2021

(65) Prior Publication Data

US 2023/0134088 A1 May 4, 2023

(51) Int. Cl.
*H04W 12/033* (2021.01)
*H04W 12/041* (2021.01)
*H04W 12/0471* (2021.01)
*H04W 12/106* (2021.01)

(52) U.S. Cl.
CPC ....... *H04W 12/033* (2021.01); *H04W 12/041* (2021.01); *H04W 12/0471* (2021.01); *H04W 12/106* (2021.01)

(58) Field of Classification Search
CPC ..... H04L 9/0861; H04L 2209/80; H04L 9/08; H04W 12/033; H04W 12/106; H04W 12/0471; H04W 12/041
See application file for complete search history.

(56) References Cited

U.S. PATENT DOCUMENTS

| | | | | |
|---|---|---|---|---|
| 9,374,683 | B2* | 6/2016 | Lee | H04W 4/06 |
| 9,713,183 | B2* | 7/2017 | Kim | H04W 76/14 |
| 2014/0106707 | A1* | 4/2014 | Bontu | H04W 76/14 455/410 |
| 2015/0382253 | A1* | 12/2015 | Suh | H04W 36/0016 455/411 |
| 2017/0142763 | A1* | 5/2017 | Bao | H04W 76/14 |
| 2017/0289108 | A1* | 10/2017 | Lee | H04W 76/27 |
| 2020/0021993 | A1* | 1/2020 | Yang | H04L 63/123 |
| 2020/0053791 | A1* | 2/2020 | Ozturk | H04W 68/00 |
| 2020/0137577 | A1* | 4/2020 | Li | H04W 12/10 |
| 2022/0394700 | A1* | 12/2022 | Ko | H04W 72/20 |

(Continued)

*Primary Examiner* — Lizbeth Torres-Diaz
(74) *Attorney, Agent, or Firm* — Procopio, Cory, Hargreaves & Savitch LLP

(57) ABSTRACT

Aspects present herein relate to methods and devices for wireless communication including an apparatus, e.g., a UE and/or a base station. The apparatus may receive, from a base station, a security mode command message associated with secure sidelink communication with at least one other UE. The apparatus may also identify, based on the security mode command message, at least one of a RRC encryption key or a user plane encryption key. Additionally, the apparatus may receive, from the base station, an indication of at least one of a common base key or the RRC encryption key. The apparatus may also identify a physical layer sidelink encryption key based on at least one of the common base key or the RRC encryption key, the physical layer sidelink encryption key being associated with the secure sidelink communication with the at least one other UE.

30 Claims, 14 Drawing Sheets

(56) References Cited

U.S. PATENT DOCUMENTS

2023/0164571 A1* 5/2023 Zhang .................. H04W 76/14
726/2
2023/0336998 A1* 10/2023 Zhao ..................... H04W 12/04

* cited by examiner

SECURE SIDELINK COMMUNICATION

TECHNICAL FIELD

The present disclosure relates generally to communication systems, and more particularly, to sidelink communication in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, to the base station, a request for secure sidelink communication with at least one other UE, where the security mode command message is received based on the transmitted request. The apparatus may also receive, from a base station, a security mode command message associated with secure sidelink communication with at least one other UE. Additionally, the apparatus may identify, based on the security mode command message, at least one of a radio resource control (RRC) encryption key or a user plane encryption key. The apparatus may also transmit, to the base station, a security mode complete message based on the identification of at least one of the RRC encryption key or the user plane encryption key. Further, the apparatus may receive, from the base station, an indication of at least one of a common base key or the RRC encryption key. The apparatus may also transmit, to the base station, an RRC reconfiguration complete message based on the indication. Moreover, the apparatus may identify a physical layer sidelink encryption key based on at least one of the common base key or the RRC encryption key, the physical layer sidelink encryption key being associated with the secure sidelink communication with the at least one other UE. The apparatus may also transmit, to the at least one other UE, or receive, from the at least one other UE, the secure sidelink communication based on the physical layer sidelink encryption key. The apparatus may also verify an authenticity of the physical layer sidelink encryption key based on the secure sidelink communication, where the authenticity of the physical layer sidelink encryption key is associated with at least one of an RRC integrity key or a physical layer integrity key.

In another aspect of the disclosure, a method, a computer-readable medium, and an apparatus are provided. The apparatus may be a base station. The apparatus may receive, from a user equipment (UE), a request for secure sidelink communication with at least one other UE. The apparatus may also transmit, to the UE, a security mode command message associated with the secure sidelink communication with the at least one other UE, the security mode command message being transmitted based on the received request. Additionally, the apparatus may receive, from the UE, a security mode complete message based on at least one of the RRC encryption key or a user plane encryption key. Further, the apparatus may transmit, to the UE, an indication of at least one of a common base key or a radio resource control (RRC) encryption key, where a physical layer sidelink encryption key may be based on at least one of the common base key or the RRC encryption key. The apparatus may also receive, from the UE, an RRC reconfiguration complete message based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
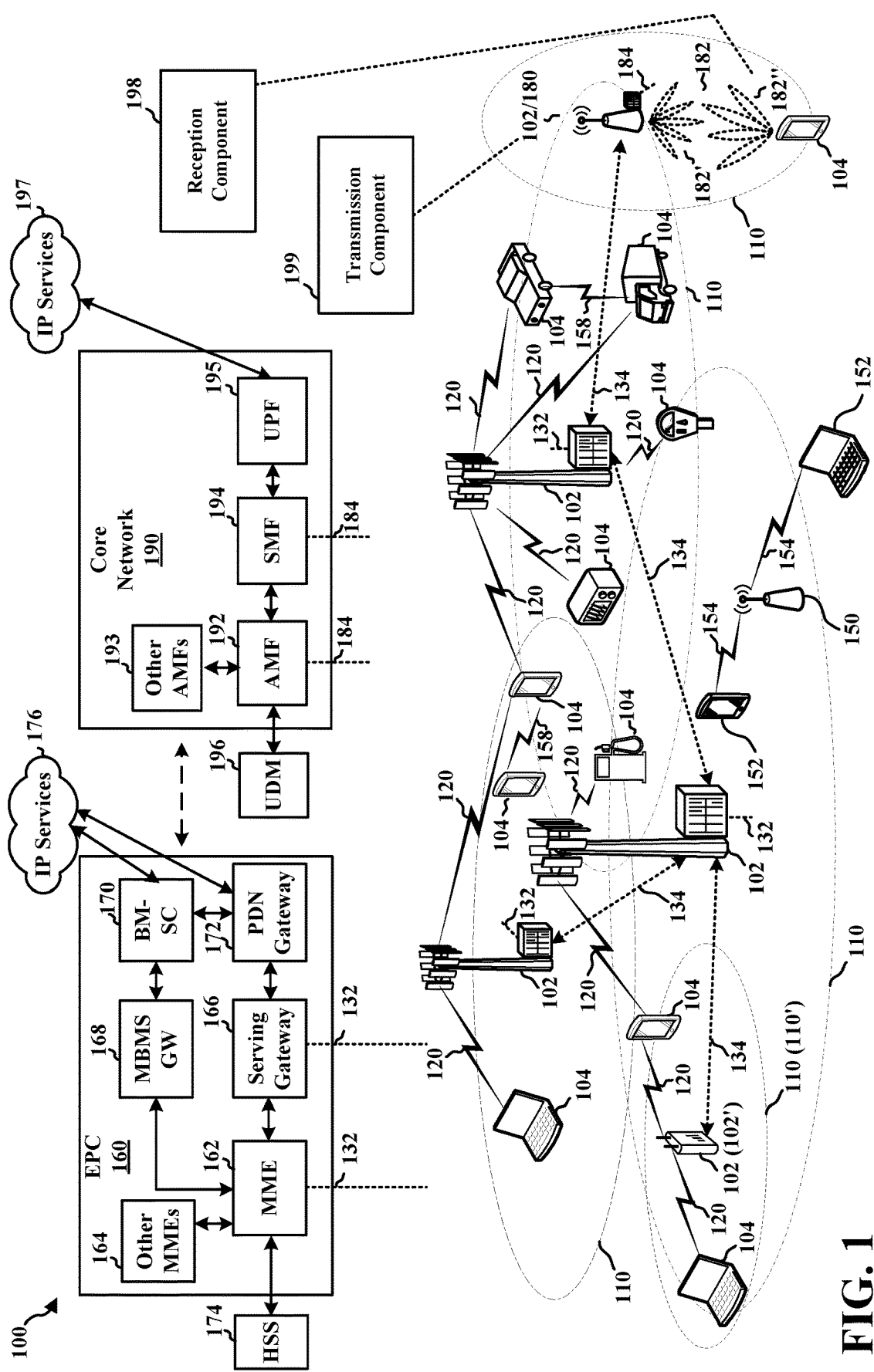
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4 a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to transmit, to the base station, a request for secure sidelink communication with at least one other UE, where the security mode command message is received based on the transmitted request. Reception component 198 may also be configured to receive, from a base station, a security mode command message associated with secure sidelink communication with at least one other UE. Reception component 198 may also be configured to identify, based on the security mode command message, at least one of a radio resource control (RRC) encryption key or a user plane encryption key. Reception component 198 may also be configured to transmit, to the base station, a security mode complete message based on the identification of at least one of the RRC encryption key or the user plane encryption key. Reception component 198 may also be configured to receive, from the base station, an indication of at least one of a common base key or the RRC encryption key. Reception component 198 may also be configured to transmit, to the base station, an RRC reconfiguration complete message based on the indication. Reception component 198 may also be configured to identify a physical layer sidelink encryption key based on at least one of the common base key or the RRC encryption key, the physical layer sidelink encryption key being associated with the secure sidelink communication with the at least one other UE. Reception component 198 may also be configured to transmit, to the at least one other UE, or receive, from the at least one other UE, the secure sidelink communication based on the physical layer sidelink encryption key. Reception component 198 may also be configured to verify an authenticity of the physical layer sidelink encryption key based on the secure sidelink communication, where the authenticity of the physical layer sidelink encryption key is associated with at least one of an RRC integrity key or a physical layer integrity key.

Referring again to FIG. 1, in certain aspects, the base station 180 may include a transmission component 199 configured to receive, from a user equipment (UE), a request for secure sidelink communication with at least one other UE. Transmission component 199 may also be configured to transmit, to the UE, a security mode command message associated with the secure sidelink communication with the at least one other UE, the security mode command message being transmitted based on the received request. Transmission component 199 may also be configured to receive, from the UE, a security mode complete message based on at least one of the RRC encryption key or a user plane encryption key. Transmission component 199 may also be configured to transmit, to the UE, an indication of at least one of a common base key or a radio resource control (RRC) encryption key, a physical layer sidelink encryption key being based on at least one of the common base key or the RRC encryption key. Transmission component 199 may also be configured to receive, from the UE, an RRC reconfiguration complete message based on the indication.

Although the following description may be focused on 5G NR, the concepts described herein may be applicable to other similar areas, such as LTE, LTE-A, CDMA, GSM, and other wireless technologies.

Figure 2:
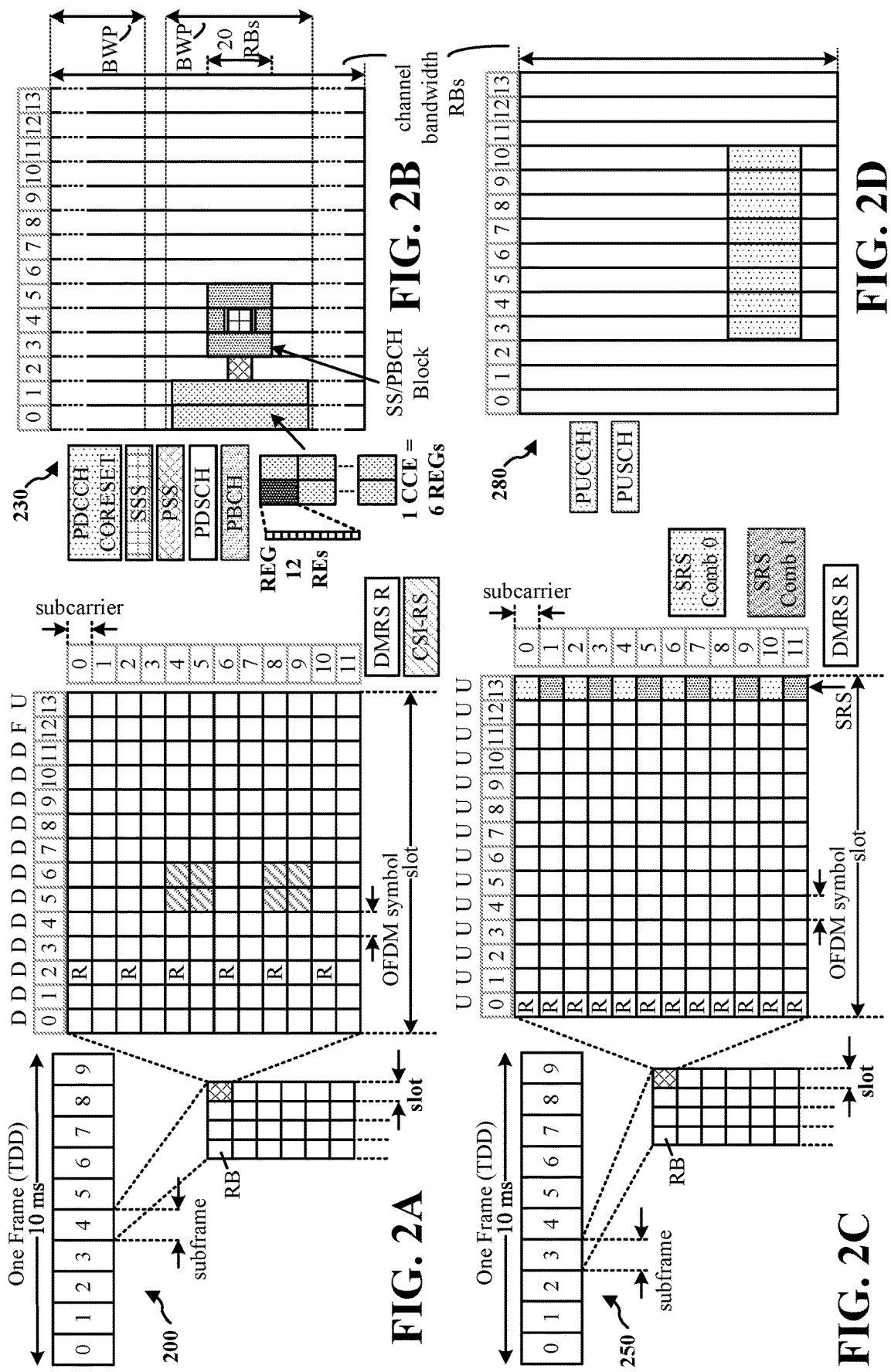
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (B SR), a power headroom report (PHR), and/or UCI.

Figure 3:
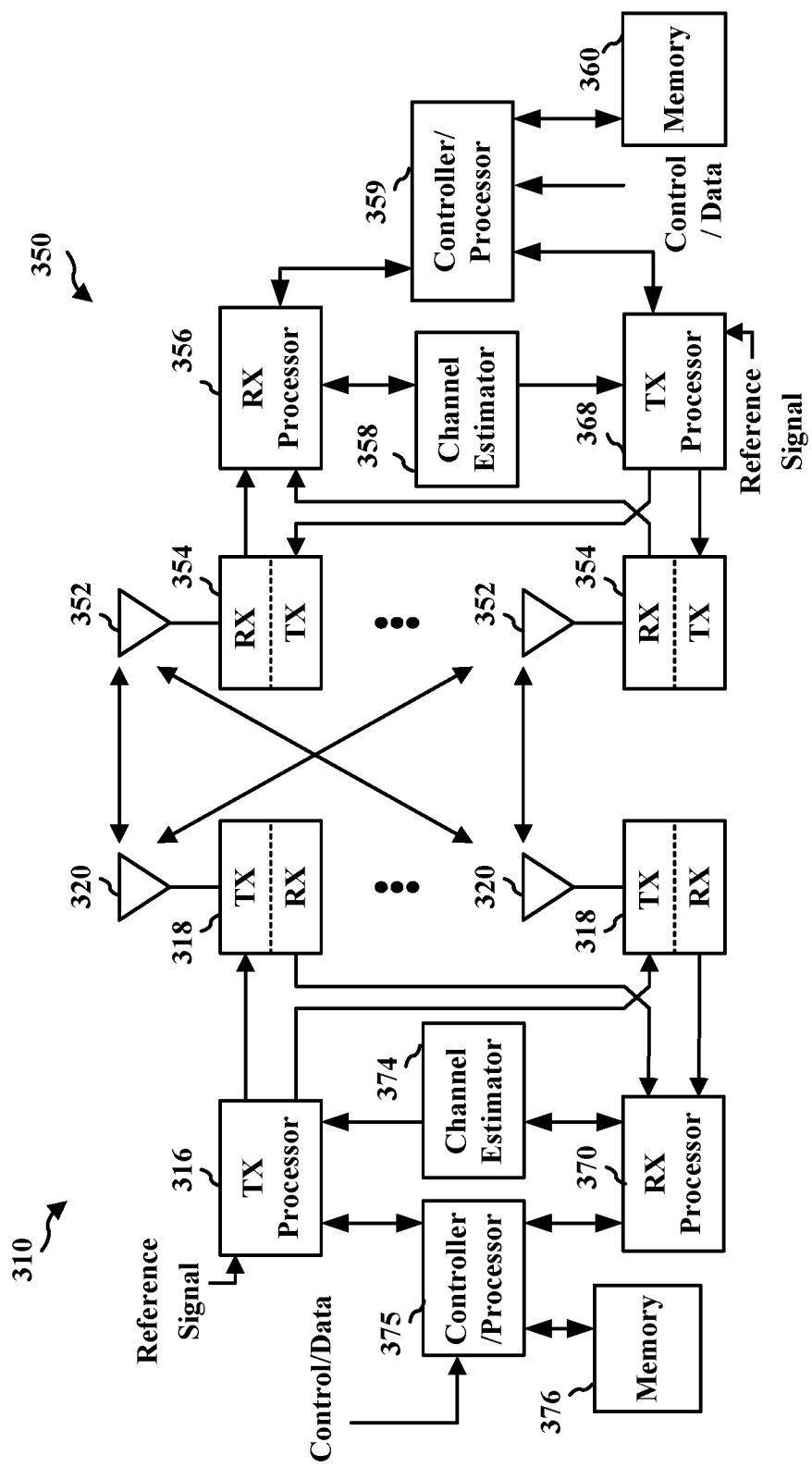
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
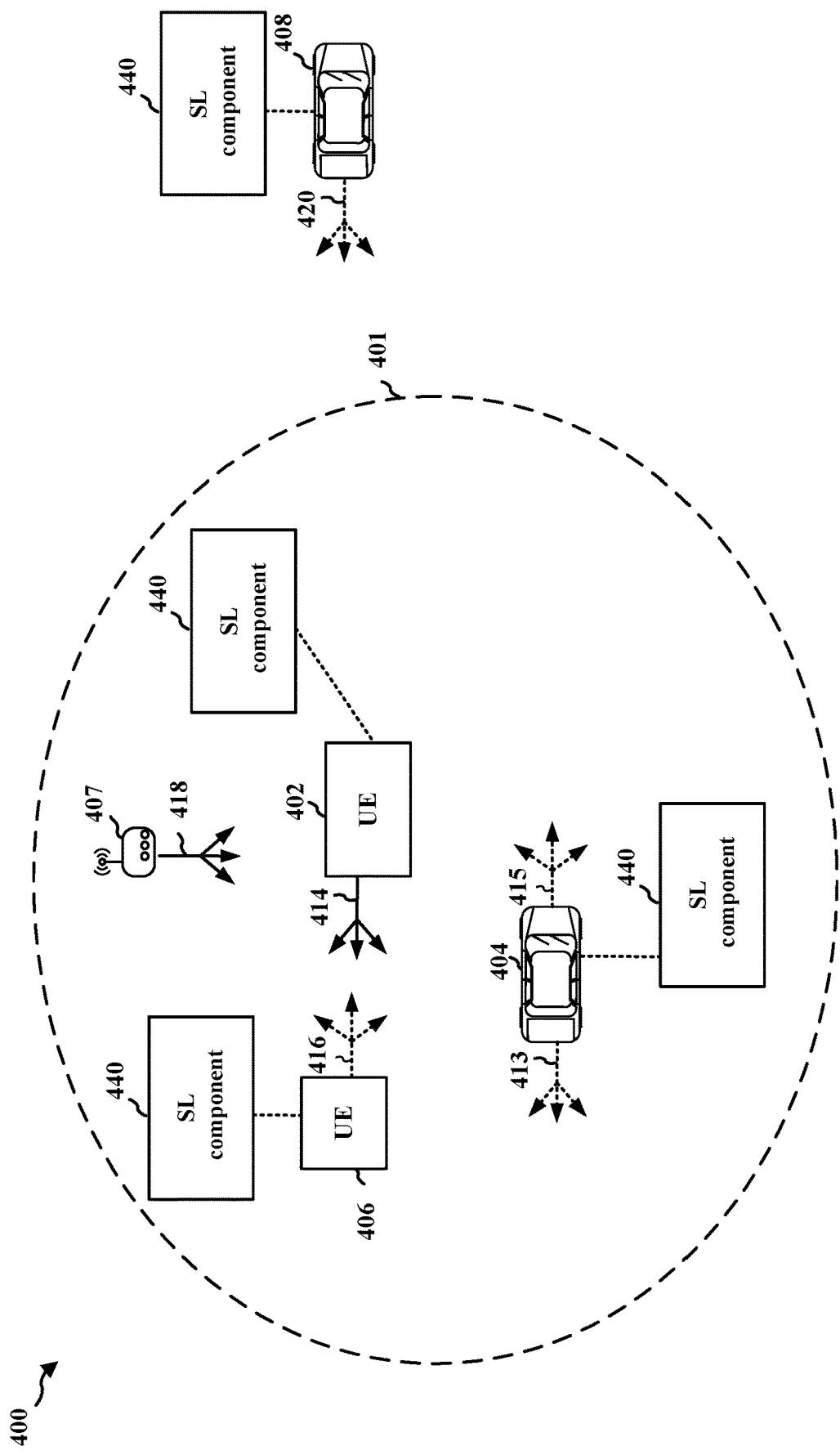
FIG. 4 is a diagram illustrating example aspects of sidelink communication between devices.

FIG. 4 is a diagram 400 illustrating example aspects of sidelink communication between devices. For example, the UE 402 may transmit a sidelink transmission 414, e.g., including a control channel (e.g., a physical sidelink control channel (PSCCH)) and/or a corresponding data channel (e.g., a physical sidelink shared channel (PSSCH)), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmissions 413, 415 intended for receipt by other UEs within a range 401 of UE 404, and UE 406 may transmit transmission 416. Additionally, RSU 407 may receive communication from and/or transmit transmission 418 to UEs 402, 404, 406, 408. One or more of the UEs 402, 404, 406, 408 or the RSU 407 may include a SL component 440.

Sidelink communication may be based on different types or modes of resource allocation mechanisms. In a first resource allocation mode (which may be referred to herein as "Mode 1"), centralized resource allocation may be provided by a network entity. For example, a base station may determine resources for sidelink communication and may allocate resources to different UEs to use for sidelink transmissions. In this first mode, a UE receives the allocation of sidelink resources from the base station. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (as discussed below). Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs. For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
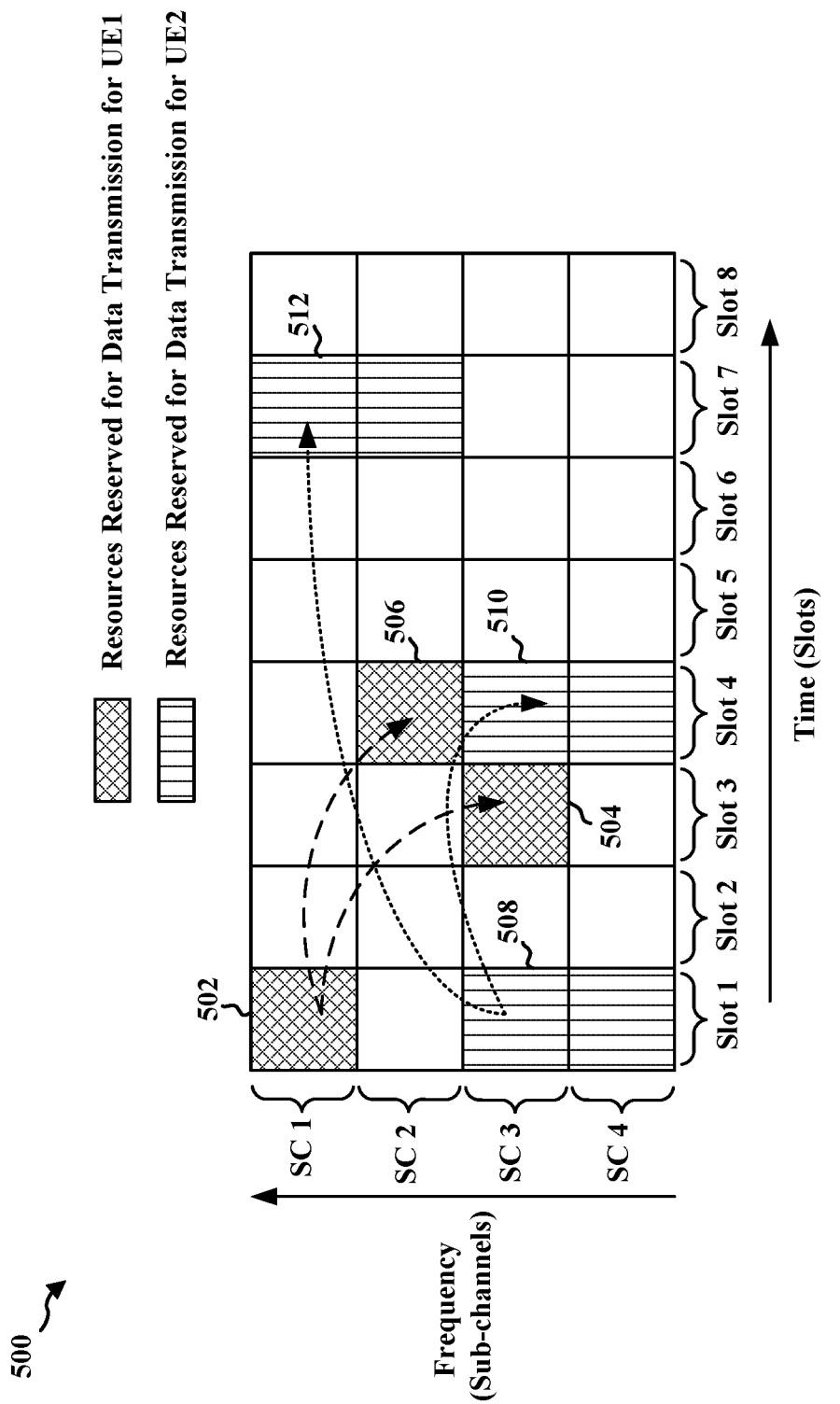
FIG. 5 is a diagram illustrating examples of resource reservation for sidelink communication.

FIG. 5 is diagram 500 illustrating an example of time and frequency resources showing reservations for sidelink transmissions. The resources may be included in a sidelink resource pool, for example. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of pre-defined slots and sub-channels, such as a window including 8 time slots by 4 sub-channels, as shown in diagram 500, which provides 32 available resource blocks in total. This window may also be referred to as a resource selection window.

A first UE (UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slot 3 and SC 2 at slot 4 for future retransmissions as shown by FIG. 4. UE1 may then transmit information regarding which resources are being used and/or reserved by it to other UE(s). UE1 may do so by including the reservation information in the reservation resource field of the SCI, e.g., a first stage SCI.

FIG. 5 illustrates that a second UE (UE2) reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit. While FIG. 5 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform a signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508 and data retransmissions 510 and 512.

Aspects of wireless communication may include a number of different applications or types of wireless communication, e.g., LTE, 5G, 6G, etc. Some types of wireless communication, e.g., 5G or 6G, may be associated with an increase in diverse applications. With an increase in the diversity of applications, security may become an important component in the design of these types of communications. For example, when a vehicle or UE (e.g., UE-A) shares its sensor information with another vehicle or UE (e.g., UE-B), it may be important to have specific guidelines regarding when one vehicle (e.g., UE-B) may be able to trust the information from another vehicle (e.g., UE-A).

In some aspects, security may be enabled at different levels/layers in a protocol stack (e.g., a physical (PHY) layer, a medium access control (MAC) layer, an application (APP) layer, etc.). Some types of security methods (e.g., in 5G) may be more focused on certain layers in the protocol stack compared to other layers in the protocol stack. For instance, some security methods may focus more on upper layer security aspects (e.g., an APP level) than lower layer security aspects (e.g., a PHY level). Further, there are certain applications where lower layer security may need to be enabled (e.g., via ranging applications) or enhanced. For example, lower layer security may need to be enabled when a time-of-arrival (ToA) of a first path may need to be correctly determined.

Some types of wireless communication include lower layer security mechanisms. For instance, PHY layer security mechanisms have been developed for UE-UTRAN (Uu) communications (e.g., downlink/uplink communications). For example, a control channel may be secured with certain code (e.g., cell radio network temporary identifier (C-RNTI) code) of a user. The other channels may be secured with other types of RNTI, e.g., paging channel secured with paging RNTI (P-RNTI) code and a random access channel secured with random access RNTI (RA-RNTI) code. Additionally, certain types of algorithms, e.g., ciphering/integrity algorithms, may be used in 5G Uu communications. In some instances, integrity protection of the user plane between devices/UEs and base stations/gNBs may be utilized. Further, some of the security algorithms in wireless communications may rely on computational complexity as a metric to quantify a security measure.

As indicated above, certain types of sidelink communications may not be secure and/or may be vulnerable to attacks at lower layers, e.g., a PHY layer. This may apply to legitimate nodes, e.g., UE-a, communicating with other legitimate nodes, e.g., UE-b, via sidelink communication. Additionally, this lack of security and potential vulnerability in sidelink communication may apply to UEs, e.g., UE-a and UE-b, that are in the coverage area of a base station or gNB.

Figure 6:
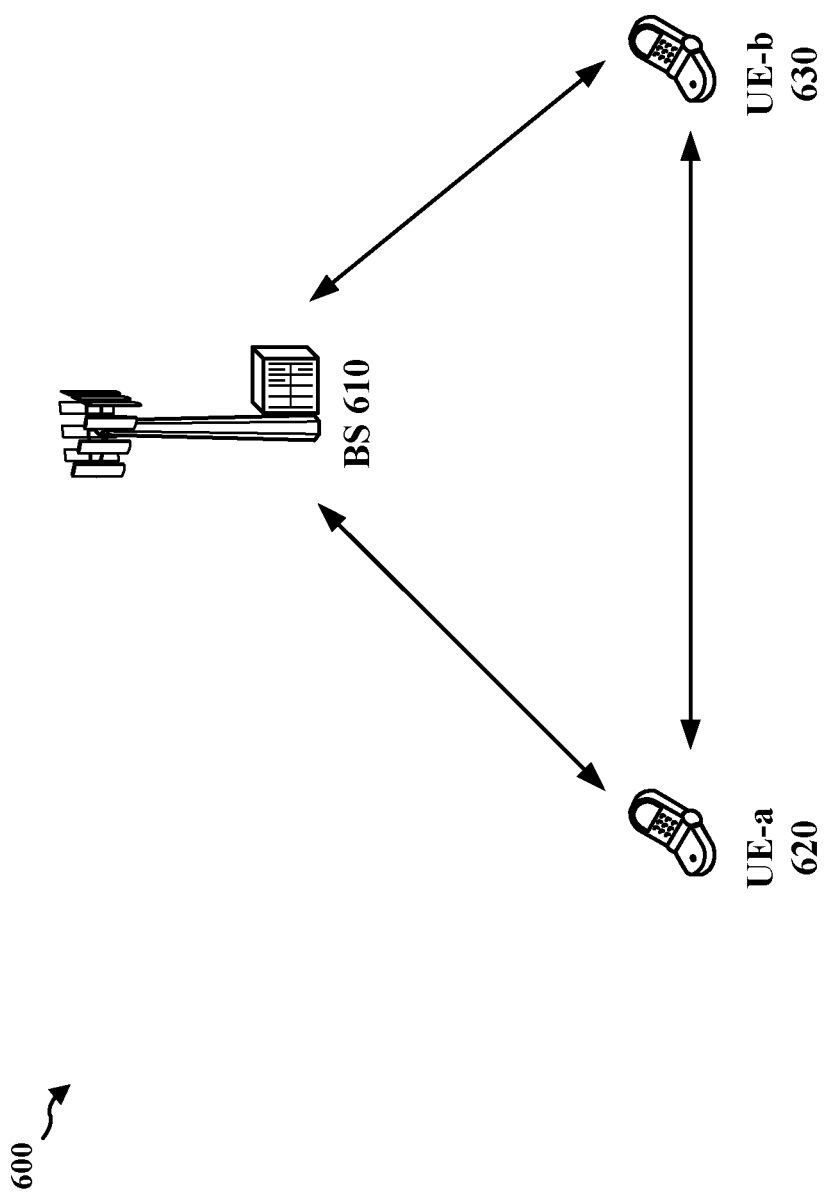
FIG. 6 is a diagram illustrating an example of sidelink communication between UEs.

FIG. 6 is a diagram 600 illustrating an example of sidelink communication between UEs. FIG. 6 includes base station 610, UE-a 620, and UE-b 630. More specifically, diagram 600 depicts sidelink communication between UE-a 620 and UE-b 630 in the coverage area of base station 610. As mentioned herein, UE-a 620 and UE-b 630 may experience a lack of security and potential vulnerability when communicating with each other via sidelink. This may also occur when UE-a 620 and UE-b 630 are communicating via sidelink and in the coverage area of base station 610.

Based on the above, it may be beneficial to determine how certain UEs (e.g., UE-a) may securely communicate with other UEs (e.g., UE-b) in sidelink. For instance, it may be beneficial for a UE-a to provide secure coordination information to UE-b. Also, it may be beneficial for certain UEs (UE-a/UE-b) to perform an integrity check and/or cipher for data communication for a control channel and other inter-UE coordination scenarios. Further, it may be beneficial to enable secure physical layer communication in sidelink for certain UEs, e.g., UE-a and UE-b, in the coverage area of a base station.

Aspects of the present disclosure may determine how certain UEs (e.g., UE-a) may securely communicate with other UEs (e.g., UE-b) in sidelink. For instance, aspects of the present disclosure may allow a UE-a to provide secure coordination information to UE-b. In some instances, aspects of the present disclosure may allow certain UEs (UE-a/UE-b) to perform an integrity check and/or cipher for data communication for a control channel, as well as other inter-UE coordination scenarios. Additionally, aspects of the present disclosure may provide secure physical layer communication in sidelink for certain UEs, e.g., UE-a and UE-b, in the coverage area of a base station.

Some aspects of the present disclosure may utilize UE-UTRAN (Uu) signaling (e.g., Uu RRC signaling) and Uu keys (e.g., Uu ciphering keys of users) to transmit a common sidelink key. Further, aspects of the present disclosure may utilize DCI signaling of sidelink PHY keys. Some aspects of the present disclosure may also provide a UE's action upon receiving these keys from a base station via certain types of signaling (e.g., RRC, DCI, or MAC-CE signaling). Additionally, aspects of the present disclosure may provide a subsequent key derivation for different layers of sidelink. Aspects of the present disclosure may also provide integrity protection for certain sidelink layers, e.g., RRC or PHY layers.

As indicated herein, aspects of the present disclosure may provide Uu RRC signaling and/or Uu ciphering keys of users to transmit a common sidelink key. In some aspects, a base station or gNB may use the Uu ciphering keys of UEs to transmit a common sidelink key independently. For instance, UE-a or UE-b may transmit a request for secure sidelink communication to a base station. The base station may also transmit a security mode command message (i.e., 'SecurityModeCommand' message) to allow the UEs to derive a gNB key ($K_{gNB}$) and/or an RRC integrity protection key ($K_{RRCint}$). The UE may then verify the integrity of the SecurityModeCommand message from the base station. Also, the UE may derive the RRC encryption key ($K_{RRCenc}$) and/or derive the user plane key encryption key ($K_{UPenc}$) for the Uu link.

In some aspects, the UE may transmit a security mode complete message (i.e., 'SecurityModeComplete' message) to indicate to the base station that its encryption and/or integrity keys have been derived and verified. For instance, the security mode complete message may indicate that a Uu RRC encryption key, a Uu RRC integrity key, a Uu user plane encryption key, and/or a Uu user plane integrity key have been derived and verified. In one instance, a base station may create a common base key ($K_{SL}$) for sidelink communication between UEs (e.g., UE-a, UE-b). The base station may scramble the common base key ($K_{SL}$) with the Uu RRC encryption keys for UE-a, UE-b (denoted respectively as $K_{RRCenc}^{a}$ and $K_{RRCenc}^{b}$). Additionally, the base station may transmit the common base key ($K_{SL}$) and the Uu RRC encryption key for UE-a ($K_{RRCenc}^{a}$) (i.e., transmit $K_{SL} \oplus K_{RRCenc}^{a}$) as a part of a Uu RRC configuration message (or Uu RRC reconfiguration message) to UE-a. Likewise, the base station may transmit the common base key or base sidelink key ($K_{SL}$) and the Uu RRC encryption key for UE-b ($K_{RRCenc}^{b}$) (i.e., transmit $K_{SL} \oplus K_{RRCenc}^{b}$) as a part of a Uu RRC configuration message (or Uu RRC reconfiguration message) to UE-b. In one aspect, the base station may send the sidelink RRC encryption key ($K_{RRCenc}^{SL}$) to the UEs, rather than send the common base key or base sidelink key ($K_{SL}$).

In addition, the base station may provide parameters for deriving a physical layer sidelink encryption key ($KPH^{PHY}_{SLenc}$) from the base sidelink key ($K_{SL}$). These parameters may include at least one of a rekeying frequency, a key derivation function (KDF), and/or one or more RRC parameters. The rekeying frequency may indicate the frequency of rekeying (e.g., once per slot, once in N slots, etc.). The key derivation function (KDF) may be used to derive the physical layer key from the base key. For instance, KDF may be specified as an index from a preconfigured KDF database. The RRC parameters (e.g., param1, param2) may be used for deriving sidelink encryption keys (e.g., sidelink RRC/user plane/PHY encryption keys).

Figure 7:
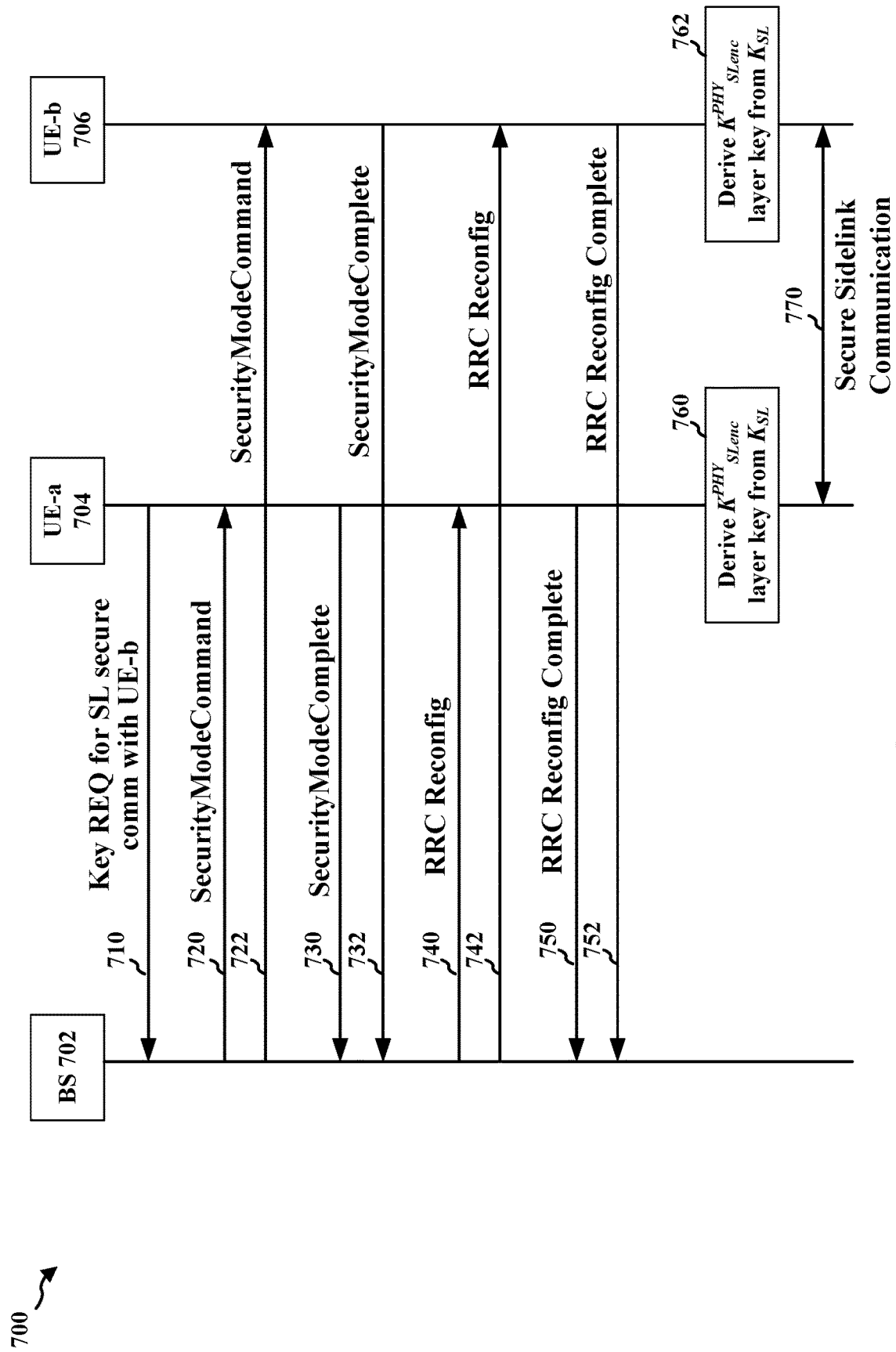
FIG. 7 is a diagram illustrating an example of communication between UEs and a base station.

FIG. 7 is a diagram 700 illustrating an example of communication between UEs and a base station. FIG. 7 includes base station 702, UE-a 704, and UE-b 706. More specifically, diagram 700 depicts a call flow of communication between base station 702, UE-a 704, and UE-b 706 in order to establish secure sidelink communication between the UEs. At 710, UE-a 704 may transmit, to base station 702, a key request for secure sidelink communication with UE-b 706. At 720 and 722, base station 702 may transmit, to UE-a 704 and UE-b 706, a security mode command (SecurityModeCommand) message associated with the secure sidelink communication. UE-a 704 and UE-b 706 may also identify/verify/derive an RRC encryption key ($K_{RRCenc}$) and/or a user plane encryption key ($K_{UPenc}$) based on the SecurityModeCommand message. At 730 and 732, UE-a 704 and UE-b 706 may transmit, to base station 702, a security mode complete (SecurityModeComplete) message. For instance, the SecurityModeComplete message may be based on the identification of the RRC encryption key ($K_{RRCenc}$) and/or the user plane encryption key ($K_{UPenc}$).

At 740 and 742, base station 702 may transmit, to UE-a 704 and UE-b 706, an indication a common base key ($K_{SL}$) and/or the RRC encryption key ($K_{RRCenc}$), such as via an RRC reconfiguration message. For example, the base station 702 may transmit the common base key ($K_{SL}$) and the Uu RRC encryption key for UE-a 704 ($K_{RRCenc}^a$) (i.e., transmit $K_{SL} \oplus K_{RRCenc}^a$) as a part of a Uu RRC configuration message (or Uu RRC reconfiguration message) to UE-a 704. The base station 702 may also transmit the common base key or base sidelink key ($K_{SL}$) and the Uu RRC encryption key for UE-b 706 ($K_{RRCenc}^b$) (i.e., transmit $K_{SL} \oplus K_{RRCenc}^b$) as a part of a Uu RRC configuration message (or Uu RRC reconfiguration message) to UE-b 706. At 750 and 752, UE-a 704 and UE-b 706 may transmit, to base station 702, an RRC reconfiguration complete message based on the indication received at 740 and 742. At 760 and 762, UE-a 704 and UE-b 706 may identify/verify/derive a physical layer sidelink encryption key ($K_{SLenc}^{PHY}$) based on the common base key ($K_{SL}$) and/or the RRC encryption key ($K_{RRCenc}$). The physical layer sidelink encryption key ($K_{SLenc}^{PHY}$) may be associated with secure sidelink communication between UE-a 704 and UE-b 706. At 770, UE-a 704 may transmit to UE-b 706, or receive from UE-b 706, secure sidelink communication based on the physical layer sidelink encryption key ($K_{SLenc}^{PHY}$). UE-a 704 and UE-b 706 may also verify an authenticity of the physical layer sidelink encryption key ($K_{SLenc}^{PHY}$) based on the secure sidelink communication.

Additionally, aspects of the present disclosure may allow for DCI signaling of sidelink physical layer (PHY) keys. In some instances, the base station may transmit the physical layer sidelink encryption key ($K_{SLenc}^{PHY}$) to be used by a UE (UE-a, UE-b) for secure sidelink communication. This physical layer sidelink encryption key ($K_{SLenc}^{PHY}$) may be sent individually via a control channel (i.e., a PDCCH) of UE-a and UE-b. As the DCI may be protected via the C-RNTIs of UE-a and UE-b, respectively, the security level of $K_{SLenc}^{PHY}$ may correspond to the security level of the control channel (i.e., a PDCCH).

In some aspects, the base station may transmit dynamic parameters (e.g., random number (RAND) parameters) to UE-a and UE-b via their respective control channels. The UEs may use the RAND parameters along with the received base sidelink key ($K_{SL}$) to derive the physical layer encryption key ($K_{SLenc}^{PHY}$). In one instance, the base station may scramble the physical layer sidelink encryption key ($K_{SLenc}^{PHY}$ with the derived gNB key for UE-a and UE-b (respectively denoted as $K_{gNB}^a$ and $K_{gNB}^b$). When scrambling the $K_{SLenc}^{PHY}$ for UE-a, the base station may send $K_{SLenc}^{PHY}$ and $K_{gNB}^a$ (i.e., $K_{SLenc}^{PHY} \oplus K_{gNB}^a$) as a part of a DCI payload to UE-a. When scrambling the $K_{SLenc}^{PHY}$ for UE-b, the base station may send $K_{SLenc}^{PHY}$ and $K_{gNB}^b$ (i.e., $K_{SLenc}^{PHY} \oplus K_{gNB}^b$) as a part of a DCI payload to UE-b.

Some aspects of the present disclosure may also provide an action of a UE when receiving the keys from the base station via RRC or DCI signaling. In some aspects, upon receiving the base sidelink key ($K_{SL}$) in RRC/DCI signaling, the UE-a and UE-b may use the parameters sent by the RRC/DCI signaling to derive an appropriate layer key. For example, the sidelink RRC encryption key and/or user plane encryption key may be derived as follows: $K_{RRCenc}^{SL}$=KDF($K_{SL}$, param1); $K_{UPenc}^{PHY}$=KDF ($K_{SL}$, param2). Here, RRC parameters (e.g., param1, param2) may be sent by the base station in RRC signaling. In another example, the UE-a and UE-b may derive the physical layer sidelink encryption key ($K_{SLenc}^{PHY}$) as follows: $K_{SLenc}^{PHY}$=KDF($K_{SL}$, slot #), where the frequency of rekeying is provided as an RRC parameter.

In some instances, aspects of the present disclosure may allow for integrity protection of sidelink RRC and PHY layers. The integrity protection algorithm that is used for sidelink RRC/PHY layers may be configured by the base station as a part of an RRC configuration message (or RRC reconfiguration message) and sent to UE-a and UE-b, respectively. The transmitting sidelink UE may use the signaled integrity algorithm to derive the RRC integrity key ($K_{RRCint}^t$) and/or the PHY integrity key ($K_{PHYint}^t$) and send the key(s) as a part of a sidelink RRC/PHY payload. The receiving sidelink UE may then calculate the RRC/PHY integrity key from the received sidelink data to compute $K_{RRCint}^r$, $K_{PHYint}^r$ and verify these key(s) are the same as $K_{RRCint}^t$, $K_{PHYint}^t$.

Figure 8:
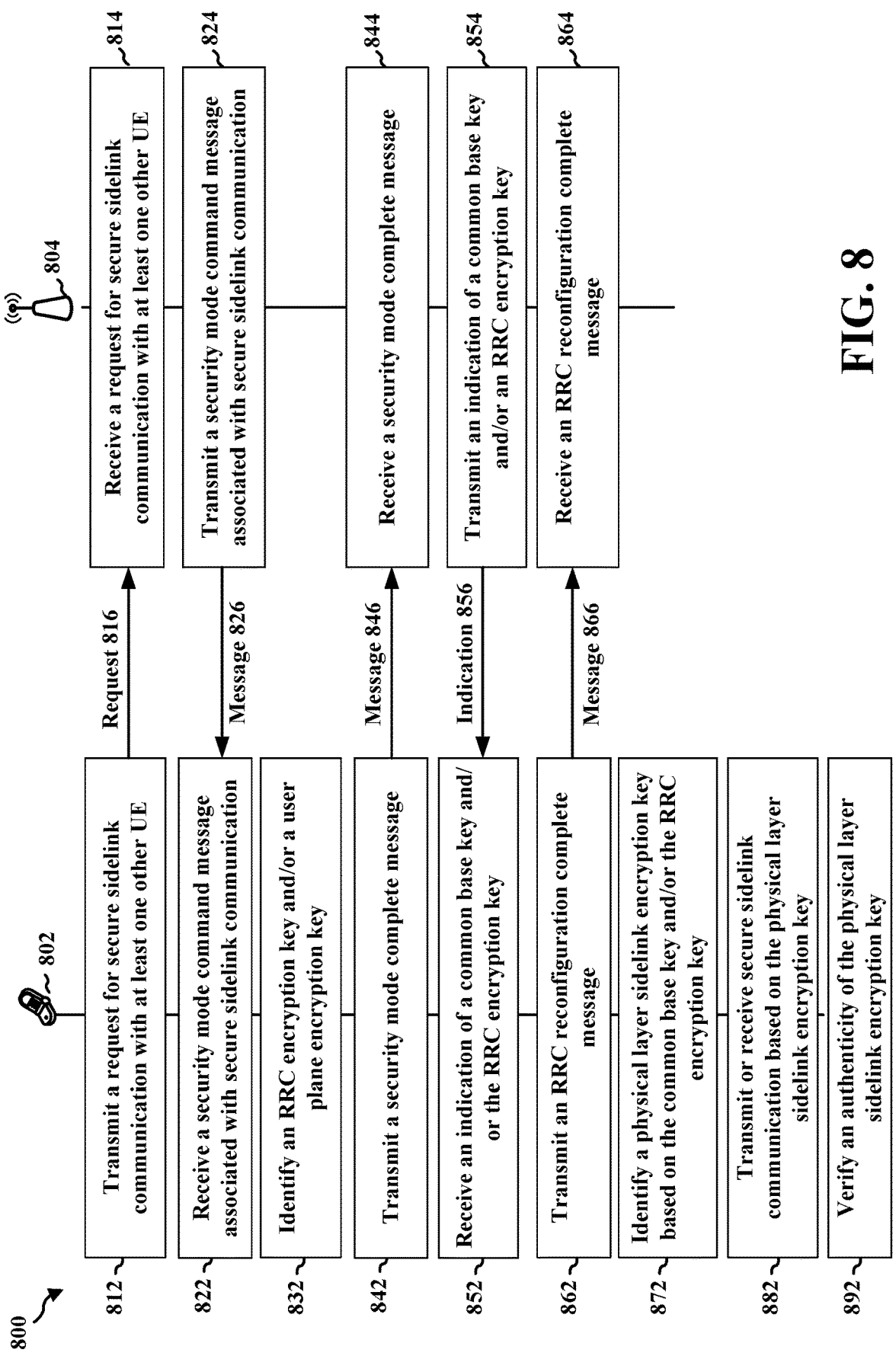
FIG. 8 is a diagram illustrating example communication between a UE and a base station.

FIG. 8 is a diagram 800 illustrating example communication between a UE 802 and a base station 804.

At 812, UE 802 may transmit, to the base station 804, a request for secure sidelink communication with at least one other UE (e.g., request 816), where a security mode command message is received based on the transmitted request. At 814, base station 804 may receive, from the UE 802 a request for secure sidelink communication with at least one other UE (e.g., request 816).

At 822, UE 802 may receive, from base station 804, a security mode command message associated with secure sidelink communication with at least one other UE (e.g., message 826). At 824, base station 804 may transmit, to the UE 802, a security mode command message associated with the secure sidelink communication with the at least one other UE (e.g., message 826), the security mode command message being transmitted based on the received request.

At 832, UE 802 may identify, based on the security mode command message, at least one of a radio resource control (RRC) encryption key or a user plane encryption key. Additionally, an integrity of the security mode command message may be verified by the UE.

At 842, UE 802 may transmit to the base station 804, a security mode complete message (e.g., message 846) based on the identification of at least one of the RRC encryption key or the user plane encryption key. At 844, base station 804 may receive, from the UE 802, a security mode complete message (e.g., message 846) based on at least one of the RRC encryption key or a user plane encryption key.

At 852, UE 802 may receive, from the base station 804, an indication of at least one of a common base key or the RRC encryption key (e.g., indication 856). At 854, base station 804 may transmit, to the UE 802, an indication of at least one of a common base key or a radio resource control (RRC) encryption key (e.g., indication 856), where a physical layer sidelink encryption key is based on at least one of the common base key or the RRC encryption key. The common base key may be at least one of the physical layer sidelink encryption key or a sidelink RRC encryption key. The indication may be an RRC reconfiguration message.

In some aspects, the indication may include a base station key or a gNB key associated with the physical layer sidelink encryption key. The base station key or the gNB key may be received via a portion of a downlink control information (DCI) payload. The indication may be received via an RRC message, a medium access control (MAC) control element (MAC-CE), downlink control information (DCI), or a physical downlink control channel (PDCCH). In some instances, the indication may include one or more parameters of the physical layer sidelink encryption key. The one or more parameters may include at least one of: a rekeying frequency, a key derivation function (KDF) for the physical layer sidelink encryption key, at least one RRC parameter, or at least one random number (RAND) parameter. The one or more parameters may also include a slot number for a key derivation function (KDF).

At 862, UE 802 may transmit, to the base station 804, an RRC reconfiguration complete message (e.g., message 866) based on the indication. At 864, base station 804 may receive, from the UE 802, an RRC reconfiguration complete message (e.g., message 866) based on the indication.

At 872, UE 802 may identify a physical layer sidelink encryption key based on at least one of the common base key or the RRC encryption key, the physical layer sidelink encryption key being associated with the secure sidelink communication with the at least one other UE.

At 882, UE 802 may transmit, to the at least one other UE, or receive, from the at least one other UE, the secure sidelink communication based on the physical layer sidelink encryption key.

At 892, UE 802 may verify an authenticity of the physical layer sidelink encryption key based on the secure sidelink communication, where the authenticity of the physical layer sidelink encryption key is associated with at least one of an RRC integrity key or a physical layer integrity key.

Figure 9:
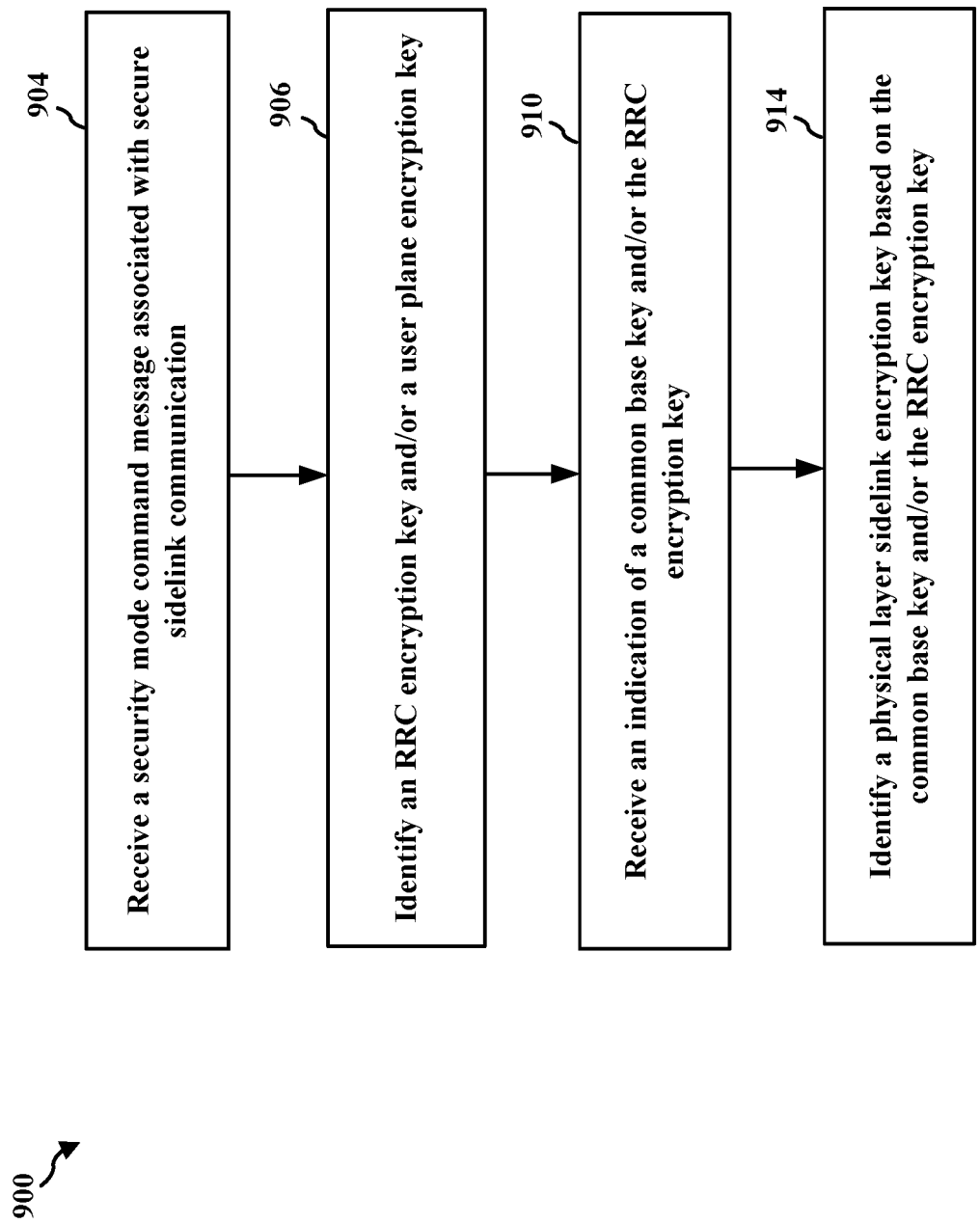
FIG. 9 is a flowchart of a method of wireless communication.

FIG. 9 is a flowchart 900 of a method of wireless communication. The method may be performed by a UE or a component of a UE (e.g., the UE 104, 350, 402, 620, 630, 704, 706, 802; the apparatus 1302). The methods described herein may provide a number of benefits, such as improving communication signaling, resource utilization, and/or power savings.

At 904, the UE may receive, from a base station, a security mode command message associated with secure sidelink communication with at least one other UE, as described in connection with the examples in FIGS. 4-8. For example, UE 802 may receive, from a base station, a security mode command message associated with secure sidelink communication with at least one other UE, as described in connection with 822 in FIG. 8. Further, 904 may be performed by determination component 1340 in FIG. 13.

At 906, the UE may identify, based on the security mode command message, at least one of a radio resource control (RRC) encryption key or a user plane encryption key, as described in connection with the examples in FIGS. 4-8. For example, UE 802 may identify, based on the security mode command message, at least one of a radio resource control (RRC) encryption key or a user plane encryption key, as described in connection with 832 in FIG. 8. Further, 906 may be performed by determination component 1340 in FIG. 13. Additionally, an integrity of the security mode command message may be verified by the UE At 910, the UE may receive, from the base station, an indication of at least one of a common base key or the RRC encryption key, as described in connection with the examples in FIGS. 4-8. For example, UE 802 may receive, from the base station, an indication of at least one of a common base key or the RRC encryption key, as described in connection with 852 in FIG. 8. Further, 910 may be performed by determination component 1340 in FIG. 13. The common base key may be at least one of the physical layer sidelink encryption key or a sidelink RRC encryption key. The indication may be an RRC reconfiguration message.

In some aspects, the indication may include a base station key or a gNB key associated with the physical layer sidelink encryption key. The base station key or the gNB key may be received via a portion of a downlink control information (DCI) payload. The indication may be received via an RRC message, a medium access control (MAC) control element (MAC-CE), downlink control information (DCI), or a physical downlink control channel (PDCCH). In some instances, the indication may include one or more parameters of the physical layer sidelink encryption key. The one or more parameters may include at least one of: a rekeying frequency, a key derivation function (KDF) for the physical layer sidelink encryption key, at least one RRC parameter, or at least one random number (RAND) parameter. The one or more parameters may also include a slot number for a key derivation function (KDF).

At 914, the UE may identify a physical layer sidelink encryption key based on at least one of the common base key or the RRC encryption key, the physical layer sidelink encryption key being associated with the secure sidelink communication with the at least one other UE, as described in connection with the examples in FIGS. 4-8. For example, UE 802 may identify a physical layer sidelink encryption key based on at least one of the common base key or the RRC encryption key, the physical layer sidelink encryption key being associated with the secure sidelink communication with the at least one other UE, as described in connection with 872 in FIG. 8. Further, 914 may be performed by determination component 1340 in FIG. 13.

Figure 10:
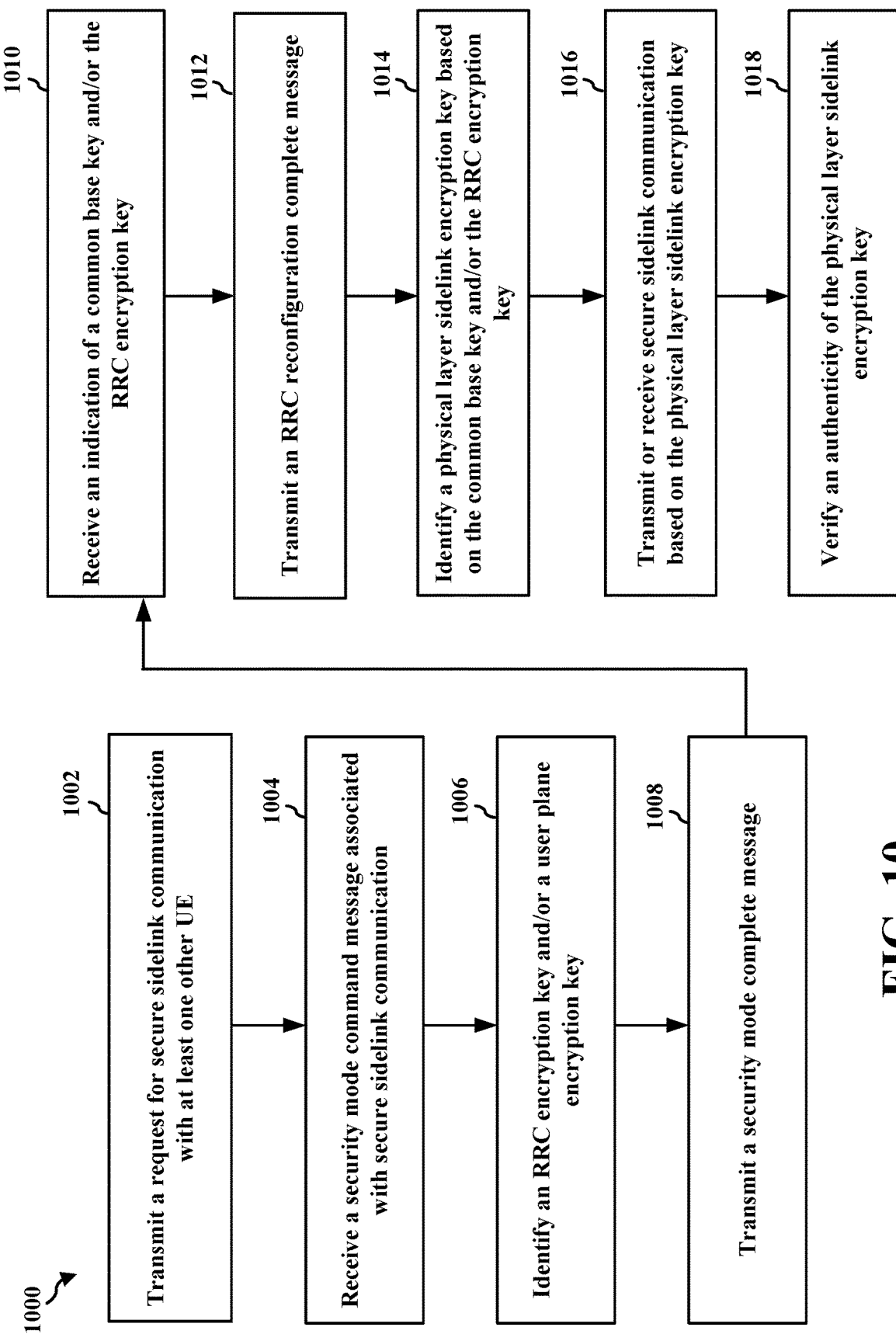
FIG. 10 is a flowchart of a method of wireless communication.

FIG. 10 is a flowchart 1000 of a method of wireless communication. The method may be performed by a UE or a component of a UE (e.g., the UE 104, 350, 402, 620, 630, 704, 706, 802; the apparatus 1302). The methods described herein may provide a number of benefits, such as improving communication signaling, resource utilization, and/or power savings.

At 1002, the UE may transmit, to the base station, a request for secure sidelink communication with at least one other UE, where the security mode command message is received based on the transmitted request, as described in connection with the examples in FIGS. 4-8. For example, UE 802 may transmit, to the base station, a request for secure sidelink communication with at least one other UE, where the security mode command message is received based on the transmitted request, as described in connection with 812 in FIG. 8. Further, 1002 may be performed by determination component 1340 in FIG. 13.

At 1004, the UE may receive, from a base station, a security mode command message associated with secure sidelink communication with at least one other UE, as described in connection with the examples in FIGS. 4-8. For example, UE 802 may receive, from a base station, a security mode command message associated with secure sidelink communication with at least one other UE, as described in connection with 822 in FIG. 8. Further, 1004 may be performed by determination component 1340 in FIG. 13.

At 1006, the UE may identify, based on the security mode command message, at least one of a radio resource control (RRC) encryption key or a user plane encryption key, as described in connection with the examples in FIGS. 4-8. For example, UE 802 may identify, based on the security mode command message, at least one of a radio resource control (RRC) encryption key or a user plane encryption key, as described in connection with 832 in FIG. 8. Further, 1006 may be performed by determination component 1340 in FIG. 13. Additionally, an integrity of the security mode command message may be verified by the UE At 1008, the UE may transmit, to the base station, a security mode complete message based on the identification of at least one of the RRC encryption key or the user plane encryption key, as described in connection with the examples in FIGS. 4-8. For example, UE 802 may transmit, to the base station, a security mode complete message based on the identification of at least one of the RRC encryption key or the user plane encryption key, as described in connection with 842 in FIG. 8. Further, 1008 may be performed by determination component 1340 in FIG. 13.

At 1010, the UE may receive, from the base station, an indication of at least one of a common base key or the RRC encryption key, as described in connection with the examples in FIGS. 4-8. For example, UE 802 may receive, from the base station, an indication of at least one of a common base key or the RRC encryption key, as described in connection with 852 in FIG. 8. Further, 1010 may be performed by determination component 1340 in FIG. 13. The common base key may be at least one of the physical layer sidelink encryption key or a sidelink RRC encryption key. The indication may be an RRC reconfiguration message.

In some aspects, the indication may include a base station key or a gNB key associated with the physical layer sidelink encryption key. The base station key or the gNB key may be received via a portion of a downlink control information (DCI) payload. The indication may be received via an RRC message, a medium access control (MAC) control element (MAC-CE), downlink control information (DCI), or a physical downlink control channel (PDCCH). In some instances, the indication may include one or more parameters of the physical layer sidelink encryption key. The one or more parameters may include at least one of: a rekeying frequency, a key derivation function (KDF) for the physical layer sidelink encryption key, at least one RRC parameter, or at least one random number (RAND) parameter. The one or more parameters may also include a slot number for a key derivation function (KDF).

At 1012, the UE may transmit, to the base station, an RRC reconfiguration complete message based on the indication, as described in connection with the examples in FIGS. 4-8. For example, UE 802 may transmit, to the base station, an RRC reconfiguration complete message based on the indication, as described in connection with 862 in FIG. 8. Further, 1012 may be performed by determination component 1340 in FIG. 13.

At 1014, the UE may identify a physical layer sidelink encryption key based on at least one of the common base key or the RRC encryption key, the physical layer sidelink encryption key being associated with the secure sidelink communication with the at least one other UE, as described in connection with the examples in FIGS. 4-8. For example, UE 802 may identify a physical layer sidelink encryption key based on at least one of the common base key or the RRC encryption key, the physical layer sidelink encryption key being associated with the secure sidelink communication with the at least one other UE, as described in connection with 872 in FIG. 8. Further, 1014 may be performed by determination component 1340 in FIG. 13.

At 1016, the UE may transmit, to the at least one other UE, or receive, from the at least one other UE, the secure sidelink communication based on the physical layer sidelink encryption key, as described in connection with the examples in FIGS. 4-8. For example, UE 802 may transmit, to the at least one other UE, or receive, from the at least one other UE, the secure sidelink communication based on the physical layer sidelink encryption key, as described in connection with 882 in FIG. 8. Further, 1016 may be performed by determination component 1340 in FIG. 13.

At 1018, the UE may verify an authenticity of the physical layer sidelink encryption key based on the secure sidelink communication, where the authenticity of the physical layer sidelink encryption key is associated with at least one of an RRC integrity key or a physical layer integrity key, as described in connection with the examples in FIGS. 4-8. For example, UE 802 may verify an authenticity of the physical layer sidelink encryption key based on the secure sidelink communication, where the authenticity of the physical layer sidelink encryption key is associated with at least one of an RRC integrity key or a physical layer integrity key, as described in connection with 892 in FIG. 8. Further, 1018 may be performed by determination component 1340 in FIG. 13.

Figure 11:
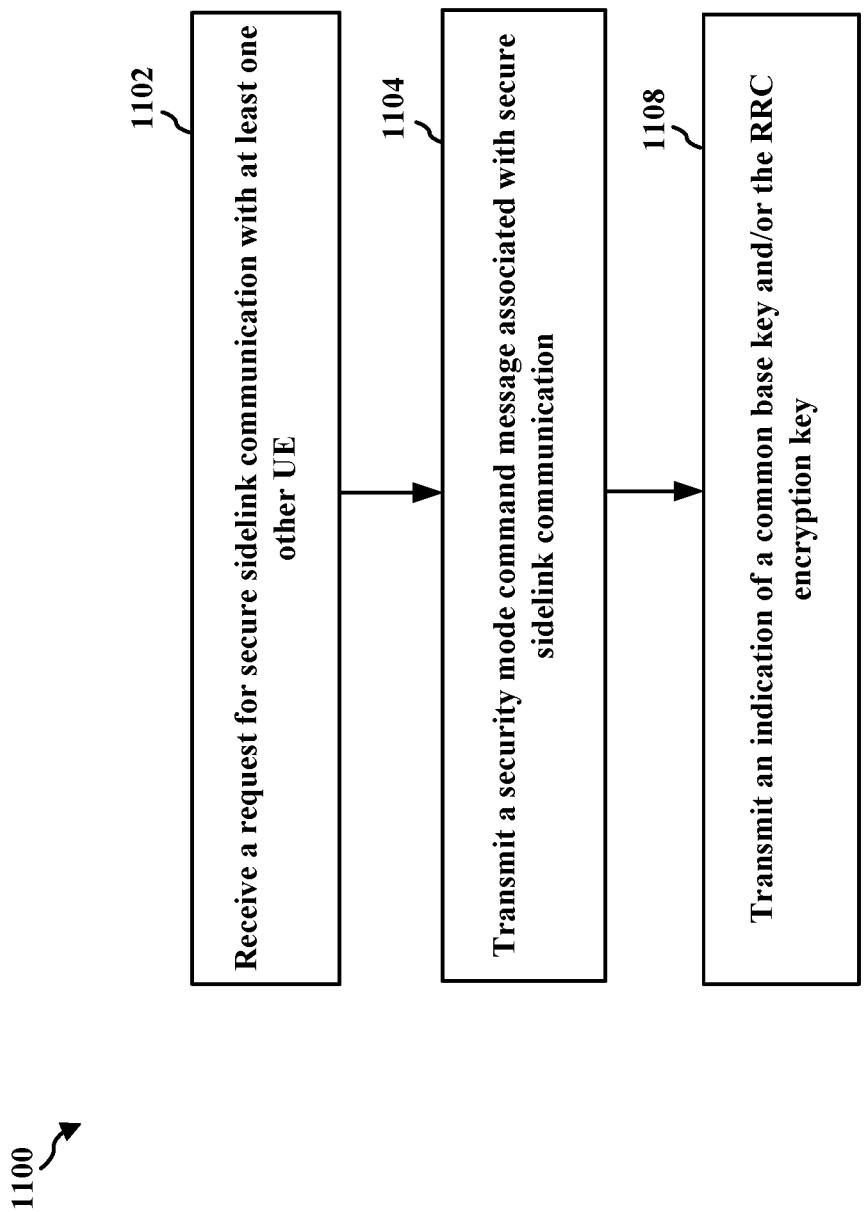
FIG. 11 is a flowchart of a method of wireless communication.

FIG. 11 is a flowchart 1100 of a method of wireless communication. The method may be performed by a base station or a component of a base station (e.g., the base station 102, 180, 310, 610, 702, 804; the apparatus 1402). The methods described herein may provide a number of benefits, such as improving communication signaling, resource utilization, and/or power savings.

At 1102, the base station may receive, from a UE, a request for secure sidelink communication with at least one other UE, as described in connection with the examples in FIGS. 4-8. For example, base station 804 may receive, from a UE, a request for secure sidelink communication with at least one other UE, as described in connection with 814 in FIG. 8. Further, 1102 may be performed by determination component 1440 in FIG. 14.

At 1104, the base station may transmit, to the UE, a security mode command message associated with the secure sidelink communication with the at least one other UE, the security mode command message being transmitted based on the received request, as described in connection with the examples in FIGS. 4-8. For example, base station 804 may transmit, to the UE, a security mode command message associated with the secure sidelink communication with the at least one other UE, the security mode command message being transmitted based on the received request, as described in connection with 824 in FIG. 8. Further, 1104 may be performed by determination component 1440 in FIG. 14.

At 1108, the base station may transmit, to the UE, an indication of at least one of a common base key or a radio resource control (RRC) encryption key, where a physical layer sidelink encryption key is based on at least one of the common base key or the RRC encryption key, as described in connection with the examples in FIGS. 4-8. For example, base station 804 may transmit, to the UE, an indication of at least one of a common base key or a radio resource control (RRC) encryption key, where a physical layer sidelink encryption key is based on at least one of the common base key or the RRC encryption key, as described in connection with 854 in FIG. 8. Further, 1108 may be performed by determination component 1440 in FIG. 14.

In some instances, the physical layer sidelink encryption key may be associated with the secure sidelink communication with the at least one other UE. The common base key may be at least one of the physical layer sidelink encryption key or a sidelink RRC encryption key. The indication may be an RRC reconfiguration message. Also, the secure sidelink communication may be transmitted from the UE to the at least one other UE, or received by the UE from the at least one other UE, based on the physical layer sidelink encryption key. Further, an authenticity of the physical layer sidelink encryption key may be verified based on the secure sidelink communication, where the authenticity of the physical layer sidelink encryption key may be associated with at least one of an RRC integrity key or a physical layer integrity key.

In some aspects, the indication may include a base station key or a gNB key associated with the physical layer sidelink encryption key. The base station key or the gNB key may be transmitted via a portion of a downlink control information (DCI) payload. The indication may be transmitted via an RRC message, a medium access control (MAC) control element (MAC-CE), downlink control information (DCI), or a physical downlink control channel (PDCCH). In some instances, the indication may include one or more parameters of the physical layer sidelink encryption key. The one or more parameters may include at least one of: a rekeying frequency, a key derivation function (KDF) for the physical layer sidelink encryption key, at least one RRC parameter, or at least one random number (RAND) parameter. The one or more parameters may also include a slot number for a key derivation function (KDF).

Figure 12:
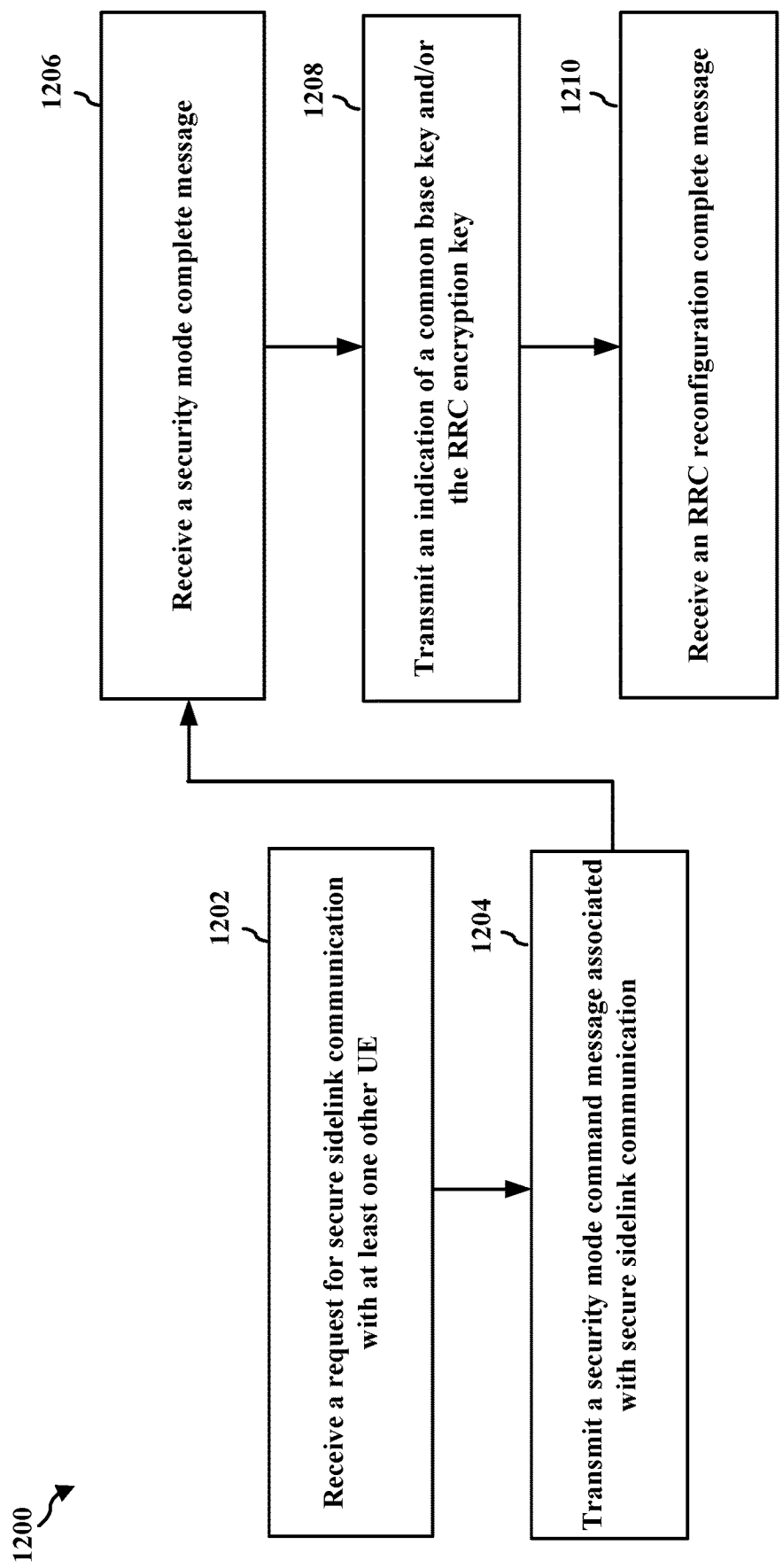
FIG. 12 is a flowchart of a method of wireless communication.

FIG. 12 is a flowchart 1200 of a method of wireless communication. The method may be performed by a base station or a component of a base station (e.g., the base station 102, 180, 310, 610, 702, 804; the apparatus 1402). The methods described herein may provide a number of benefits, such as improving communication signaling, resource utilization, and/or power savings.

At 1202, the base station may receive, from a UE, a request for secure sidelink communication with at least one other UE, as described in connection with the examples in FIGS. 4-8. For example, base station 804 may receive, from a UE, a request for secure sidelink communication with at least one other UE, as described in connection with 814 in FIG. 8. Further, 1202 may be performed by determination component 1440 in FIG. 14.

At 1204, the base station may transmit, to the UE, a security mode command message associated with the secure sidelink communication with the at least one other UE, the security mode command message being transmitted based on the received request, as described in connection with the examples in FIGS. 4-8. For example, base station 804 may transmit, to the UE, a security mode command message associated with the secure sidelink communication with the at least one other UE, the security mode command message being transmitted based on the received request, as described in connection with 824 in FIG. 8. Further, 1204 may be performed by determination component 1440 in FIG. 14.

At 1206, the base station may receive, from the UE, a security mode complete message based on at least one of the RRC encryption key or a user plane encryption key, as described in connection with the examples in FIGS. 4-8. For example, base station 804 may receive, from the UE, a security mode complete message based on at least one of the RRC encryption key or a user plane encryption key, as described in connection with 844 in FIG. 8. Further, 1206 may be performed by determination component 1440 in FIG. 14. An integrity of the security mode command message may be verified by the UE.

At 1208, the base station may transmit, to the UE, an indication of at least one of a common base key or a radio resource control (RRC) encryption key, where a physical layer sidelink encryption key is based on at least one of the common base key or the RRC encryption key, as described in connection with the examples in FIGS. 4-8. For example, base station 804 may transmit, to the UE, an indication of at least one of a common base key or a radio resource control (RRC) encryption key, where a physical layer sidelink encryption key is based on at least one of the common base key or the RRC encryption key, as described in connection with 854 in FIG. 8. Further, 1208 may be performed by determination component 1440 in FIG. 14.

In some instances, the physical layer sidelink encryption key may be associated with the secure sidelink communication with the at least one other UE. The common base key may be at least one of the physical layer sidelink encryption key or a sidelink RRC encryption key. The indication may be an RRC reconfiguration message. Also, the secure sidelink communication may be transmitted from the UE to the at least one other UE, or received by the UE from the at least one other UE, based on the physical layer sidelink encryption key. Further, an authenticity of the physical layer sidelink encryption key may be verified based on the secure sidelink communication, where the authenticity of the physical layer sidelink encryption key may be associated with at least one of an RRC integrity key or a physical layer integrity key.

In some aspects, the indication may include a base station key or a gNB key associated with the physical layer sidelink encryption key. The base station key or the gNB key may be transmitted via a portion of a downlink control information (DCI) payload. The indication may be transmitted via an RRC message, a medium access control (MAC) control element (MAC-CE), downlink control information (DCI), or a physical downlink control channel (PDCCH). In some instances, the indication may include one or more parameters of the physical layer sidelink encryption key. The one or more parameters may include at least one of: a rekeying frequency, a key derivation function (KDF) for the physical layer sidelink encryption key, at least one RRC parameter, or at least one random number (RAND) parameter. The one or more parameters may also include a slot number for a key derivation function (KDF).

At 1210, the base station may receive, from the UE, an RRC reconfiguration complete message based on the indication, as described in connection with the examples in FIGS. 4-8. For example, base station 804 may receive, from the UE, an RRC reconfiguration complete message based on the indication, as described in connection with 864 in FIG. 8. Further, 1210 may be performed by determination component 1440 in FIG. 14.

Figure 13:
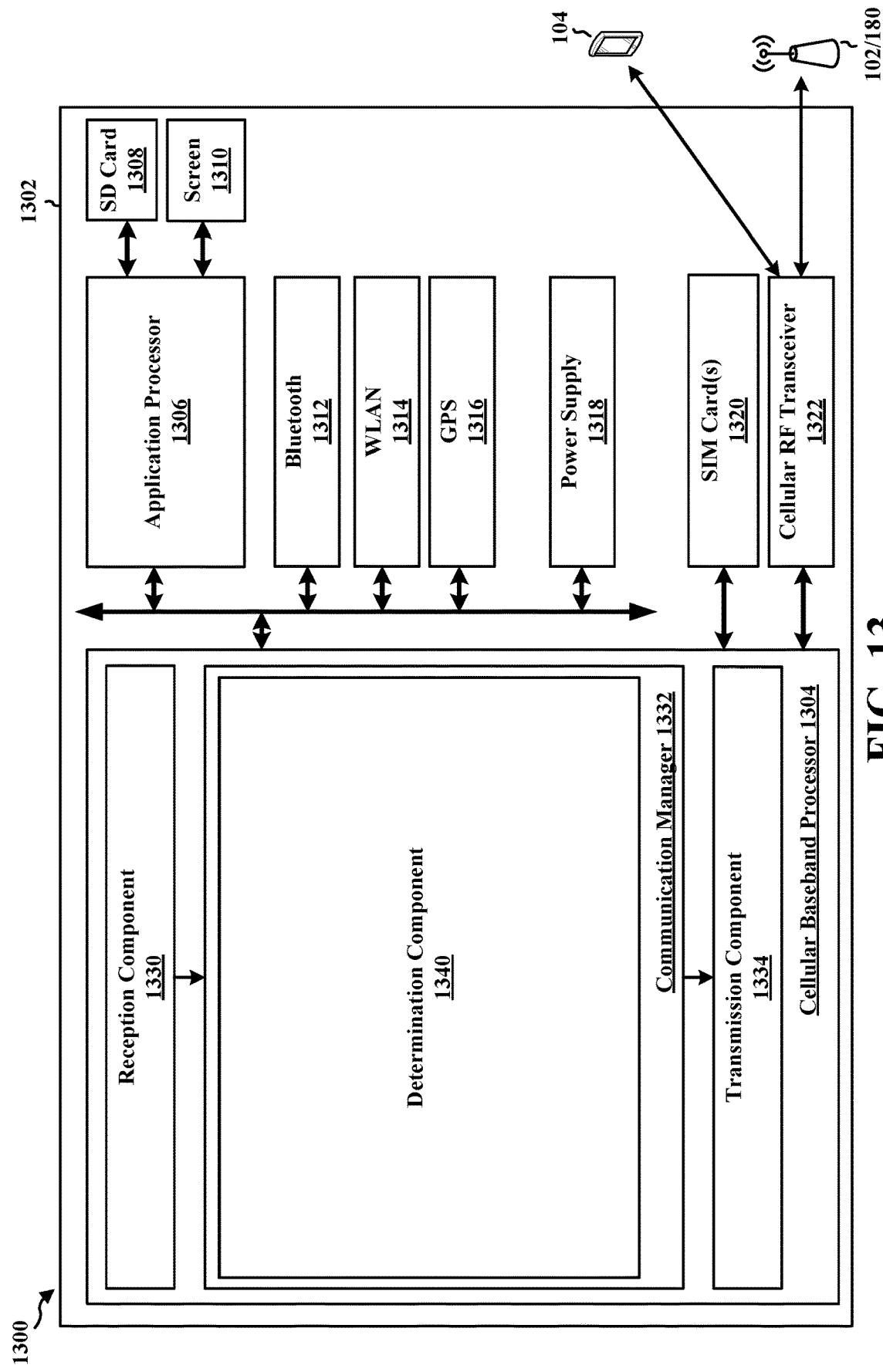
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a determination component 1340 that is configured to transmit, to the base station, a request for the secure sidelink communication with the at least one other UE, where the security mode command message is received based on the transmitted request, e.g., as described in connection with step 1002 above. Determination component 1340 may also be configured to receive, from a base station, a security mode command message associated with secure sidelink communication with at least one other UE, e.g., as described in connection with step 1004 above. Determination component 1340 may also be configured to identify, based on the security mode command message, at least one of a radio resource control (RRC) encryption key or a user plane encryption key, e.g., as described in connection with step 1006 above. Determination component 1340 may also be configured to transmit, to the base station, a security mode complete message based on the identification of at least one of the RRC encryption key or the user plane encryption key, e.g., as described in connection with step 1008 above. Determination component 1340 may also be configured to receive, from the base station, an indication of at least one of a common base key or the RRC encryption key, e.g., as described in connection with step 1010 above. Determination component 1340 may also be configured to transmit, to the base station, an RRC reconfiguration complete message based on the indication, e.g., as described in connection with step 1012 above. Determination component 1340 may also be configured to identify a physical layer sidelink encryption key based on at least one of the common base key or the RRC encryption key, the physical layer sidelink encryption key being associated with the secure sidelink communication with the at least one other UE, e.g., as described in connection with step 1014 above. Determination component 1340 may also be configured to transmit, to the at least one other UE, or receive, from the at least one other UE, the secure sidelink communication based on the physical layer sidelink encryption key, e.g., as described in connection with step 1016 above. Determination component 1340 may also be configured to verify an authenticity of the physical layer sidelink encryption key based on the secure sidelink communication, where the authenticity of the physical layer sidelink encryption key is associated with at least one of an RRC integrity key or a physical layer integrity key, e.g., as described in connection with step 1018 above.

The apparatus may include additional components that perform each of the blocks of the algorithm in the flowcharts of FIGS. 8-10. As such, each block in the flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for transmitting, to the base station, a request for the secure sidelink communication with the at least one other UE, where the security mode command message is received based on the transmitted request; means for receiving, from a base station, a security mode command message associated with secure sidelink communication with at least one other UE; means for identifying, based on the security mode command message, at least one of a radio resource control (RRC) encryption key or a user plane encryption key; means for transmitting, to the base station, a security mode complete message based on the identification of at least one of the RRC encryption key or the user plane encryption key; means for receiving, from the base station, an indication of at least one of a common base key or the RRC encryption key; means for transmitting, to the base station, an RRC reconfiguration complete message based on the indication; means for identifying a physical layer sidelink encryption key based on at least one of the common base key or the RRC encryption key, the physical layer sidelink encryption key being associated with the secure sidelink communication with the at least one other UE; means for transmitting, to the at least one other UE, or means for receiving, from the at least one other UE, the secure sidelink communication based on the physical layer sidelink encryption key; and means for verifying an authenticity of the physical layer sidelink encryption key based on the secure sidelink communication, where the authenticity of the physical layer sidelink encryption key is associated with at least one of an RRC integrity key or a physical layer integrity key. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
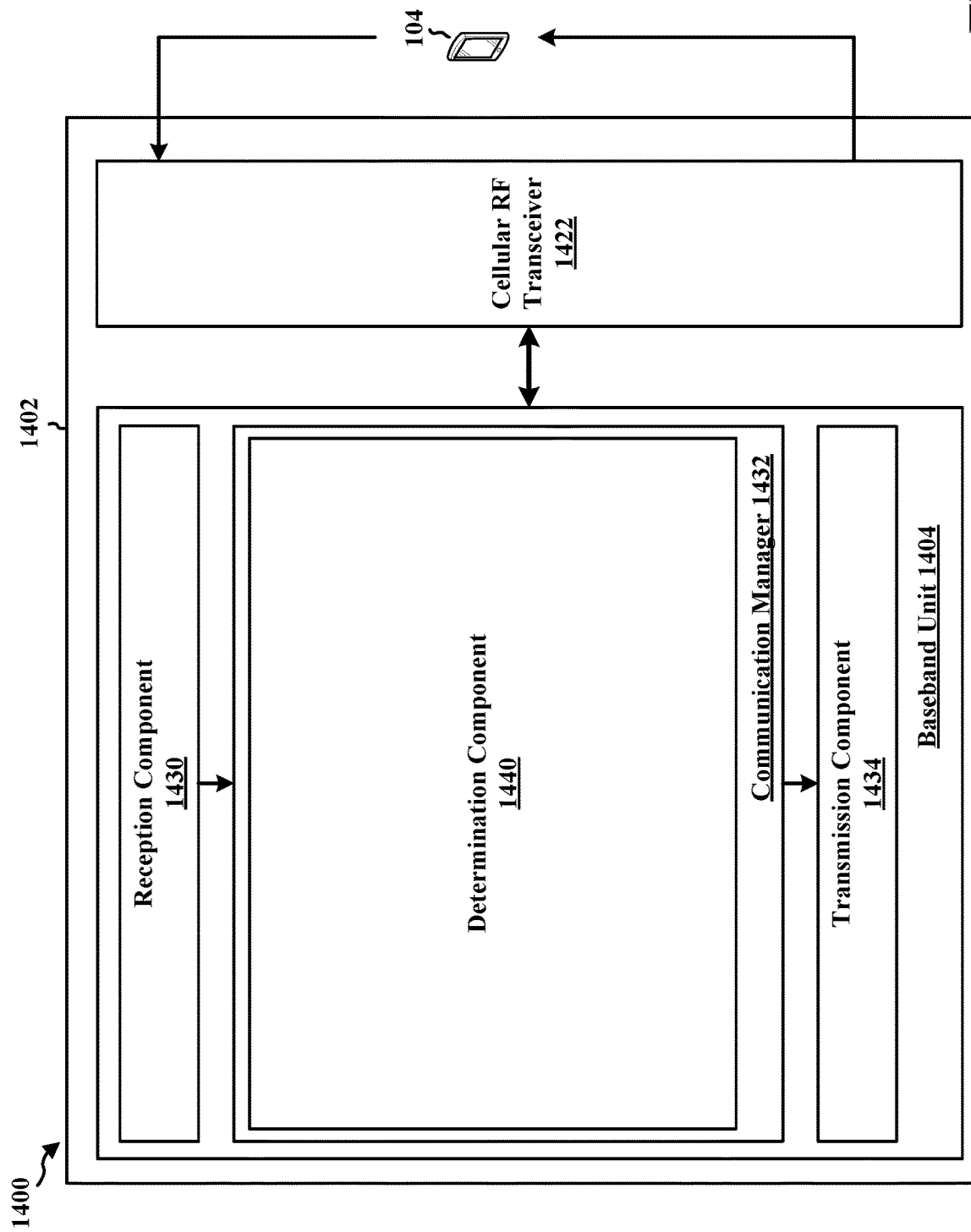
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a determination component 1440 that is configured to receive, from a user equipment (UE), a request for secure sidelink communication with at least one other UE, e.g., as described in connection with step 1202 above. Determination component 1440 may also be configured to transmit, to the UE, a security mode command message associated with the secure sidelink communication with the at least one other UE, the security mode command message being transmitted based on the received request, e.g., as described in connection with step 1204 above. Determination component 1440 may also be configured to receive, from the UE, a security mode complete message based on at least one of the RRC encryption key or a user plane encryption key, e.g., as described in connection with step 1206 above. Determination component 1440 may also be configured to transmit, to the UE, an indication of at least one of a common base key or a radio resource control (RRC) encryption key, a physical layer sidelink encryption key being based on at least one of the common base key or the RRC encryption key, e.g., as described in connection with step 1208 above. Determination component 1440 may also be configured to receive, from the UE, an RRC reconfiguration complete message based on the indication, e.g., as described in connection with step 1210 above.

The apparatus may include additional components that perform each of the blocks of the algorithm in the flowcharts of FIGS. 8, 11, and 12. As such, each block in the flowcharts of FIGS. 8, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving, from a user equipment (UE), a request for secure sidelink communication with at least one other UE; means for transmitting, to the UE, a security mode command message associated with the secure sidelink communication with the at least one other UE, the security mode command message being transmitted based on the received request; means for receiving, from the UE, a security mode complete message based on at least one of the RRC encryption key or a user plane encryption key; means for transmitting, to the UE, an indication of at least one of a common base key or a radio resource control (RRC) encryption key, a physical layer sidelink encryption key being based on at least one of the common base key or the RRC encryption key; and means for receiving, from the UE, an RRC reconfiguration complete message based on the indication. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a base station, a security mode command message associated with secure sidelink communication with at least one other UE; identify, based on the security mode command message, at least one of a radio resource control (RRC) encryption key or a user plane encryption key; receive, from the base station, an indication of at least one of a common base key or the RRC encryption key; and identify a physical layer sidelink encryption key based on at least one of the common base key or the RRC encryption key, the physical layer sidelink encryption key being associated with the secure sidelink communication with the at least one other UE.

Aspect 2 is the apparatus of aspect 1, where the at least one processor is further configured to: transmit, to the base station, a request for the secure sidelink communication with the at least one other UE, where the security mode command message is received based on the transmitted request.

Aspect 3 is the apparatus of any of aspects 1 and 2, where the common base key is at least one of the physical layer sidelink encryption key or a sidelink RRC encryption key.

Aspect 4 is the apparatus of any of aspects 1 to 3, where the at least one processor is further configured to: transmit, to the base station, a security mode complete message based on the identification of at least one of the RRC encryption key or the user plane encryption key.

Aspect 5 is the apparatus of any of aspects 1 to 4, where the indication includes a base station key or a gNB key associated with the physical layer sidelink encryption key.

Aspect 6 is the apparatus of any of aspects 1 to 5, where the base station key or the gNB key is received via a portion of a downlink control information (DCI) payload.

Aspect 7 is the apparatus of any of aspects 1 to 6, where the indication is received via an RRC message, a medium access control (MAC) control element (MAC-CE), downlink control information (DCI), or a physical downlink control channel (PDCCH).

Aspect 8 is the apparatus of any of aspects 1 to 7, where the indication includes one or more parameters of the physical layer sidelink encryption key.

Aspect 9 is the apparatus of any of aspects 1 to 8, where the one or more parameters include at least one of: a rekeying frequency, a key derivation function (KDF) for the physical layer sidelink encryption key, at least one RRC parameter, or at least one random number (RAND) parameter.

Aspect 10 is the apparatus of any of aspects 1 to 9, where the one or more parameters include a slot number for a key derivation function (KDF).

Aspect 11 is the apparatus of any of aspects 1 to 10, where the at least one processor is further configured to: transmit, to the at least one other UE, or receiving, from the at least one other UE, the secure sidelink communication based on the physical layer sidelink encryption key.

Aspect 12 is the apparatus of any of aspects 1 to 11, where the at least one processor is further configured to: verify an authenticity of the physical layer sidelink encryption key based on the secure sidelink communication, where the authenticity of the physical layer sidelink encryption key is associated with at least one of an RRC integrity key or a physical layer integrity key.

Aspect 13 is the apparatus of any of aspects 1 to 12, where the at least one processor is further configured to: transmit, to the base station, an RRC reconfiguration complete message based on the indication.

Aspect 14 is the apparatus of any of aspects 1 to 13, where an integrity of the security mode command message is verified by the UE, and where the indication is an RRC reconfiguration message.

Aspect 15 is the apparatus of any of aspects 1 to 14, further including a transceiver or an antenna coupled to the at least one processor.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

Aspect 19 is an apparatus for wireless communication at a base station including at least one processor coupled to a memory and configured to: receive, from a user equipment (UE), a request for secure sidelink communication with at least one other UE; transmit, to the UE, a security mode command message associated with the secure sidelink communication with the at least one other UE, the security mode command message being transmitted based on the received request; and transmit, to the UE, an indication of at least one of a common base key or a radio resource control (RRC) encryption key, a physical layer sidelink encryption key being based on at least one of the common base key or the RRC encryption key.

Aspect 20 is the apparatus of aspect 19, where the physical layer sidelink encryption key is associated with the secure sidelink communication with the at least one other UE.

Aspect 21 is the apparatus of any of aspects 19 and 20, where the common base key is at least one of the physical layer sidelink encryption key or a sidelink RRC encryption key.

Aspect 22 is the apparatus of any of aspects 19 to 21, where the at least one processor is further configured to: receive, from the UE, a security mode complete message based on at least one of the RRC encryption key or a user plane encryption key.

Aspect 23 is the apparatus of any of aspects 19 to 22, where the indication includes a base station key or a gNB key associated with the physical layer sidelink encryption key.

Aspect 24 is the apparatus of any of aspects 19 to 23, where the base station key or the gNB key is transmitted via a portion of a downlink control information (DCI) payload.

Aspect 25 is the apparatus of any of aspects 19 to 24, where the indication is transmitted via an RRC message, a medium access control (MAC) control element (MAC-CE), downlink control information (DCI), or a physical downlink control channel (PDCCH).

Aspect 26 is the apparatus of any of aspects 19 to 25, where the indication includes one or more parameters of the physical layer sidelink encryption key.

Aspect 27 is the apparatus of any of aspects 19 to 26, where the one or more parameters include at least one of: a rekeying frequency, a key derivation function (KDF) for the physical layer sidelink encryption key, at least one RRC parameter, or at least one random number (RAND) parameter.

Aspect 28 is the apparatus of any of aspects 19 to 27, where the one or more parameters include a slot number for a key derivation function (KDF).

Aspect 29 is the apparatus of any of aspects 19 to 28, where the secure sidelink communication is transmitted from the UE to the at least one other UE, or received by the UE from the at least one other UE, based on the physical layer sidelink encryption key.

Aspect 30 is the apparatus of any of aspects 19 to 29, where an authenticity of the physical layer sidelink encryption key is verified based on the secure sidelink communication, where the authenticity of the physical layer sidelink encryption key is associated with at least one of an RRC integrity key or a physical layer integrity key.

Aspect 31 is the apparatus of any of aspects 19 to 30, where the at least one processor is further configured to: receive, from the UE, an RRC reconfiguration complete message based on the indication.

Aspect 32 is the apparatus of any of aspects 19 to 31, where an integrity of the security mode command message is verified by the UE, and where the indication is an RRC reconfiguration message.

Aspect 33 is the apparatus of any of aspects 19 to 32, further including a transceiver or an antenna coupled to the at least one processor.

Aspect 34 is a method of wireless communication for implementing any of 19 to 33.

Aspect 35 is an apparatus for wireless communication including means for implementing any of aspects 19 to 33.

Aspect 36 is a computer-readable medium storing computer executable code, where the code when executed by a processor causes the processor to implement any of aspects 19 to 33.

What is claimed is:

1. An apparatus for wireless communication at a user equipment (UE), comprising:
    memory; and
    at least one processor coupled to the memory and configured to:
        receive, from a base station, a security mode command message associated with secure sidelink communication with at least one other UE, wherein the base station is different from the at least one other UE;
        identify, based on the security mode command message, information of a radio resource control (RRC) encryption key and a user plane encryption key, the user plane encryption key being associated with a UE-Universal Mobile Telecommunications System (UMTS) Terrestrial Radio Access Network (UTRAN) (Uu) link different from a sidelink;
        transmit, to the base station, a security mode complete message based on the user plane encryption key or the RRC encryption key;
        receive, from the base station after the security mode complete message, an indication of a common base key and the RRC encryption key, wherein the indication comprises the common base key scrambled with the RRC encryption key;
        identify a physical layer sidelink encryption key based on the indication and the common base key scrambled with the RRC encryption key, the physical layer sidelink encryption key being associated with the secure sidelink communication with the at least one other UE; and
        communicate with the at least one other UE based on the physical layer sidelink encryption key.

2. The apparatus of claim 1, wherein the at least one processor is further configured to:
    transmit, to the base station, a request for the secure sidelink communication with the at least one other UE, wherein to receive the security mode command message, the at least one processor is configured to receive the security mode command message based on the transmitted request.

3. The apparatus of claim 1, wherein the common base key is a sidelink RRC encryption key.

4. The apparatus of claim 1, wherein the security mode complete message is based on the identification of the RRC encryption key and the user plane encryption key.

5. The apparatus of claim 1, wherein the indication includes a base station key or a gNB key associated with the physical layer sidelink encryption key.

6. The apparatus of claim 5, wherein to receive the indication, the at least one processor is configured to: receive the base station key or the gNB key via a portion of a downlink control information (DCI) payload.

7. The apparatus of claim 5, wherein to receive the indication, the at least one processor is configured to: receive the indication via an RRC message, a medium access control (MAC) control element (MAC-CE), downlink control information (DCI), or a physical downlink control channel (PDCCH).

8. The apparatus of claim 1, wherein the indication includes one or more parameters of the physical layer sidelink encryption key.

9. The apparatus of claim 8, wherein the one or more parameters include at least one of: a rekeying frequency, a key derivation function (KDF) for the physical layer sidelink encryption key, at least one RRC parameter, or at least one random number (RAND) parameter.

10. The apparatus of claim 8, wherein the one or more parameters include a slot number for a key derivation function (KDF).

11. The apparatus of claim 1, wherein the at least one processor is further configured to:
    transmit, to the at least one other UE, or receive, from the at least one other UE, the secure sidelink communication based on the physical layer sidelink encryption key.

12. The apparatus of claim 11, wherein the at least one processor is further configured to:
    verify an authenticity of the physical layer sidelink encryption key based on the secure sidelink communication, wherein the authenticity of the physical layer sidelink encryption key is associated with at least one of an RRC integrity key or a physical layer integrity key.

13. The apparatus of claim 1, further comprising a transceiver or an antenna coupled to the at least one processor, wherein the at least one processor is further configured to:
    transmit, to the base station, an RRC reconfiguration complete message based on the indication.

14. The apparatus of claim 1, wherein an integrity of the security mode command message is verified by the UE, and wherein the indication is an RRC reconfiguration message.

15. A method of wireless communication at a user equipment (UE), comprising:
    receiving, from a base station, a security mode command message associated with secure sidelink communication with at least one other UE, wherein the base station is different from the at least one other UE;

identifying, based on the security mode command message, information of a radio resource control (RRC) encryption key and a user plane encryption key, the user plane encryption key being associated with a UE-Universal Mobile Telecommunications System (UMTS) Terrestrial Radio Access Network (UTRAN) (Uu) link different from a sidelink;

transmitting, to the base station, a security mode complete message based on the user plane encryption key or the RRC encryption key;

receiving, from the base station after the security mode complete message, an indication of a common base key and the RRC encryption key, wherein the indication comprises the common base key scrambled with the RRC encryption key;

identifying a physical layer sidelink encryption key based on the indication and the common base key scrambled with the RRC encryption key, the physical layer sidelink encryption key being associated with the secure sidelink communication with the at least one other UE; and communicating with the at least one other UE based on the physical layer sidelink encryption key.

16. An apparatus for wireless communication at a base station, comprising:

memory; and at least one processor coupled to the memory and configured to:

receive, from a user equipment (UE), a request for secure sidelink communication with at least one other UE;

transmit, to the UE, a security mode command message associated with the secure sidelink communication with the at least one other UE, the security mode command message being transmitted based on the received request, wherein the at least one other UE is different from the base station, and wherein the security mode command message comprises information of a radio resource control (RRC) encryption key and a user plane encryption key, the user plane encryption key being associated with a UE-Universal Mobile Telecommunications System (UMTS) Terrestrial Radio Access Network (UTRAN) (Uu) link different from a sidelink;

receive, from the base station, a security mode complete message based on the user plane encryption key or the RRC encryption key; and transmit, to the UE after the security mode complete message, an indication of a common base key and the RRC encryption key, wherein the indication comprises the common base key scrambled with the RRC encryption key, a physical layer sidelink encryption key being based on the user plane encryption key and at least one of the common base key or the RRC encryption key.

17. The apparatus of claim 16, wherein the physical layer sidelink encryption key is associated with the secure sidelink communication with the at least one other UE.

18. The apparatus of claim 16, wherein the common base key is a sidelink RRC encryption key.

19. The apparatus of claim 16, wherein the at least one processor is further configured to:

receive, from the UE, the security mode complete message based on the RRC encryption key and the user plane encryption key.

20. The apparatus of claim 16, wherein the indication includes a base station key or a gNB key associated with the physical layer sidelink encryption key.

21. The apparatus of claim 20, wherein to transmit the indication, the at least one processor is configured to: transmit the base station key or the gNB key via a portion of a downlink control information (DCI) payload.

22. The apparatus of claim 20, wherein to transmit the indication, the at least one processor is configured to: transmit the indication via an RRC message, a medium access control (MAC) control element (MAC-CE), downlink control information (DCI), or a physical downlink control channel (PDCCH).

23. The apparatus of claim 16, wherein the indication includes one or more parameters of the physical layer sidelink encryption key.

24. The apparatus of claim 23, wherein the one or more parameters include at least one of: a rekeying frequency, a key derivation function (KDF) for the physical layer sidelink encryption key, at least one RRC parameter, or at least one random number (RAND) parameter.

25. The apparatus of claim 23, wherein the one or more parameters include a slot number for a key derivation function (KDF).

26. The apparatus of claim 16, wherein the secure sidelink communication is transmitted from the UE to the at least one other UE, or received by the UE from the at least one other UE, based on the physical layer sidelink encryption key.

27. The apparatus of claim 26, wherein an authenticity of the physical layer sidelink encryption key is verified based on the secure sidelink communication, wherein the authenticity of the physical layer sidelink encryption key is associated with at least one of an RRC integrity key or a physical layer integrity key.

28. The apparatus of claim 16, further comprising a transceiver or an antenna coupled to the at least one processor, wherein the at least one processor is further configured to:

receive, from the UE, an RRC reconfiguration complete message based on the indication.

29. The apparatus of claim 16, wherein an integrity of the security mode command message is verified by the UE, and wherein the indication is an RRC reconfiguration message.

30. A method of wireless communication at a base station, comprising:

receiving, from a user equipment (UE), a request for secure sidelink communication with at least one other UE, wherein the at least one other UE is different from the base station;

transmitting, to the UE, a security mode command message associated with the secure sidelink communication with the at least one other UE, the security mode command message being transmitted based on the received request, and wherein the security mode command message comprises information of a radio resource control (RRC) encryption key and a user plane encryption key, the user plane encryption key being associated with a UE-Universal Mobile Telecommunications System (UMTS) Terrestrial Radio Access Network (UTRAN) (Uu) link different from a sidelink;

receiving, from the base station, a security mode complete message based on the user plane encryption key or the RRC encryption key; and transmitting, to the UE after the security mode complete message, an indication of a common base key and the RRC encryption key, wherein the indication comprises the common base key scrambled with the RRC encryption key, a physical layer sidelink encryption key being based on the user plane encryption key and at least one of the common base key or the RRC encryption key.

* * * * *